(12) United States Patent
Sato

(10) Patent No.: US 6,710,942 B2
(45) Date of Patent: Mar. 23, 2004

(54) SUPER WIDE-ANGLE LENS SYSTEM AND SHOOTING DEVICE USING THE SAME

(75) Inventor: Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/269,969

(22) Filed: Oct. 15, 2002

(65) Prior Publication Data

US 2003/0103275 A1 Jun. 5, 2003

(30) Foreign Application Priority Data

Oct. 17, 2001 (JP) ......................................... 2001-319813

(51) Int. Cl.⁷ ............................. G02B 13/04; G02B 13/18
(52) U.S. Cl. ........................ 359/749; 359/753; 359/708
(58) Field of Search ................................. 359/749, 753, 359/708, 680, 681, 682, 750, 751, 752, 793, 649, 650, 651

(56) References Cited

U.S. PATENT DOCUMENTS

| 4,449,793 A | 5/1984 | Nakamura et al. .......... 359/749 |
| 4,806,003 A | 2/1989 | Mukai et al. ................ 359/750 |
| 5,315,441 A | 5/1994 | Hori et al. .................. 359/753 |
| 5,631,780 A | 5/1997 | Sato ............................ 359/749 |

FOREIGN PATENT DOCUMENTS

| JP | 1-134411 | 5/1989 |
| JP | 7-35974 | 2/1995 |

*Primary Examiner*—Ricky Mack
(74) *Attorney, Agent, or Firm*—Miles & Stockbridge P.C.

(57) ABSTRACT

A large aperture super wide-angle lens system has an angle of view of $2\omega=94°$ or more, an f-number of about 1.4, small variation in close-range aberrations, compactness, and high optical performance. The lens system includes, in order from an object, a negative lens group GN having negative refractive power which is fixed upon focusing, and a positive lens group GP having positive refractive power as a whole which is moved upon focusing. The positive lens group GP includes a front lens group GF having an aperture stop and a rear lens group GR having positive refractive power. Focusing at a close object is carried out by moving the front lens group GF and the rear lens group GR to the object side with different moving amounts. Prescribed conditional expressions are satisfied.

26 Claims, 15 Drawing Sheets

FOCUSING

SUPER WIDE-ANGLE LENS SYSTEM AND SHOOTING DEVICE USING THE SAME

The disclosures of the following priority application is herein incorporated by reference:

Japanese Patent Application No. 2001-319813 filed Oct. 17, 2001.

BACKGROUND OF THE INVENTION

1. Field of the Invention

The present invention relates to a super wide-angle lens system having a large angle of view and, in particular, to a large aperture, retrofocus type, super wide-angle lens system having a floating adjustment mechanism and a shooting device using the same.

2. Related Background Art

In the large aperture, super wide-angle lens system proposed so far, it has been scarce that has a large aperture of f/1.4 and a covering angle (an angle of view) of $2\omega=94°$ or more.

As a focusing method for a large aperture, super wide-angle lens system, Japanese Patent Application Laid-Open No. 1-134411 discloses an internal focusing system for a large aperture, super wide-angle lens system, in which the focusing is carried out by moving a lens group in the lens system.

Moreover, the inventor of the present application disclosed a rear focusing, large aperture wide-angle lens system in Japanese Patent Application Laid-Open No. 7-35974. In the system, focusing is carried by moving only the most image side lens group in the lens system.

As described above, a lens system having a covering angle (an angle of view) of $2\omega=94°$ or more and an f-number of 1.4 has been scarcely proposed in patent applications. A lens system equipped with those specifications does not exist on the market.

The present invention proposes a large aperture, super wide-angle lens system having a covering angle (an angle of view) of $2\omega=94°$ or more and an f-number of 1.4, which has been never yet proposed. In order to develop a large aperture, super wide-angle lens system, there are technical problems such as compactness for general use, high optical performance, securing a peripheral quantity of light, using an aspherical surface having high productivity, and, in particular, controlling variation in aberrations upon focusing at a close or short distant object relative to aberrations upon focusing at an object at infinity, of a super wide angle lens system having extremely large angle of view. This variation is referred to as variation in close-range aberration or close-range aberration variation hereinafter.

The larger the aperture is, the smaller the maximum permissible aberrations for high optical performance are. Difficulty in correcting close-range aberration variation in addition to difficulty in improving optical performance upon focusing at infinity makes it further difficult to accomplish a lens system having the specifications. Accordingly, using only conventional technique cannot realize satisfactory result.

From this point of view, the lens system disclosed in Japanese Patent Application Laid-Open No. 1-134411 has small angle of view and is rather large in comparison with other conventional lens system. In addition, if you try to make the lens system to have a wider angle of view, the lens system becomes further larger. Moreover, correction of astigmatism and coma is not sufficient, so variation in aberrations upon focusing is not small sufficiently. Furthermore, since the lens system carries out focusing by moving inner lens group of a retrofocus type lens system, the lens system unavoidably becomes large in order to secure dead space.

On the other hand, no matter how expands the lens designing technique, a lens design having high optical performance and compactness cannot be derived from the lens system disclosed in Japanese Patent Application Laid-Open No. 7-35974.

SUMMARY OF THE INVENTION

The present invention is made in view of the aforementioned problems and has an object to provide a large aperture super wide-angle lens system having an angle of view of $2\omega=94°$ or more, an f-number of about 1.4, small variation in close-range aberrations, compactness, and high optical performance.

According to one aspect of the present invention, a super wide-angle lens system includes, in order from an object, a negative lens group GN having negative refractive power which is fixed upon focusing, and a positive lens group GP having positive refractive power as a whole which is moved upon focusing. The positive lens group GP includes a front lens group GF having an aperture stop and a rear lens group GR having positive refractive power. Focusing at a short distant or close object is carried out by moving the front lens group GF and the rear lens group GR to the object side with different moving amounts. The following conditional expression (1) is satisfied:

$$0.1 < XR/XF < 1.0 \tag{1}$$

where XF and XR denote the moving amounts of the front lens group GF and the rear lens group GR, respectively, when focusing at an any close object.

In one preferred embodiment of the invention, the following conditional expression (2) is satisfied:

$$0.1 < |FR/FF| < 5.2 \tag{2}$$

where FF denotes the focal length of the front lens group GF, and FR denotes the focal length of the rear lens group GR.

In one preferred embodiment of the invention, the following conditional expression (3) is satisfied:

$$1.0 < -FN/FP < 5.0 \tag{3}$$

where FN denotes the focal length of the negative lens group GN, and FP denotes the focal length of the positive lens group GP.

In one preferred embodiment of the invention, the negative lens group GN includes at least one negative lens element and at least one positive lens element locating to the image side of the negative lens element. The negative lens element has an aspherical surface facing to a concave surface side. When the aspherical surface is expressed by the following expression:

$$X(y) = (y^2/r0)/\left[1 + (1 - \kappa \cdot y^2/r0^2)^{1/2}\right] + $$
$$C3 \cdot |y^3| + C4 \cdot y^4 + C6 \cdot y^6 + C8 \cdot y^8 + $$
$$C10 \cdot y^{10} + C12 \cdot y^{12} + C14 \cdot y^{14},$$

the following conditional expression (4) is satisfied:

$$-1.0 < \kappa < 1.0 \quad (4)$$

where X(y) denotes the displacement (sag amount) in the optical axis direction from the tangent plane of the vertex of the aspherical surface at the height y from the optical axis in a vertical direction relative to the optical axis to the aspherical surface, r0 denotes the reference radius of curvature, K denotes the conical coefficient, Cn denotes an n-th order aspherical coefficient.

In one preferred embodiment of the invention, the front lens group GF includes a negative lens element located to the object side of the aperture stop. The negative lens element has an aspherical surface including a $3^{rd}$ order aspherical coefficient C3. When the aspherical surface is expressed by the following expression:

$$X(y) = (y^2/r0) / \left[1 + (1 - \kappa \cdot y^2/r0^2)^{1/2}\right] +$$
$$C3 \cdot |y^3| + C4 \cdot y^4 + C5 \cdot |y^5| +$$
$$C6 \cdot y^6 + C7 \cdot |y^7| + C8 \cdot y^8 +$$
$$C10 \cdot y^{10} + C12 \cdot y^{12},$$

the following conditional expression (5) is satisfied:

$$1.0 \times 10^{-6} < |C3| < 1.0 \times 10^{-2} \quad (5).$$

In one preferred embodiment of the invention, the negative lens element locating the most object side of the negative lens group GN having an aspherical surface which is a hybrid aspherical lens constructed by a glass material and a resin material. The following conditional expression (6) is satisfied:

$$0.0015 < (dmax - d0)/F0 < 0.5 \quad (6)$$

where d0 denotes the thickness along the optical axis of the resin material forming the aspherical surface, dmax denotes the thickness of the resin material in the direction of the optical axis where the thickness becomes maximum within the effective aperture, and F0 denotes the focal length of the super wide-angle lens system.

According to another feature of the present invention, a shooting device uses the super wide-angle lens system.

DESCRIPTION OF THE PREFERRED EMBODIMENTS

Figure 1:
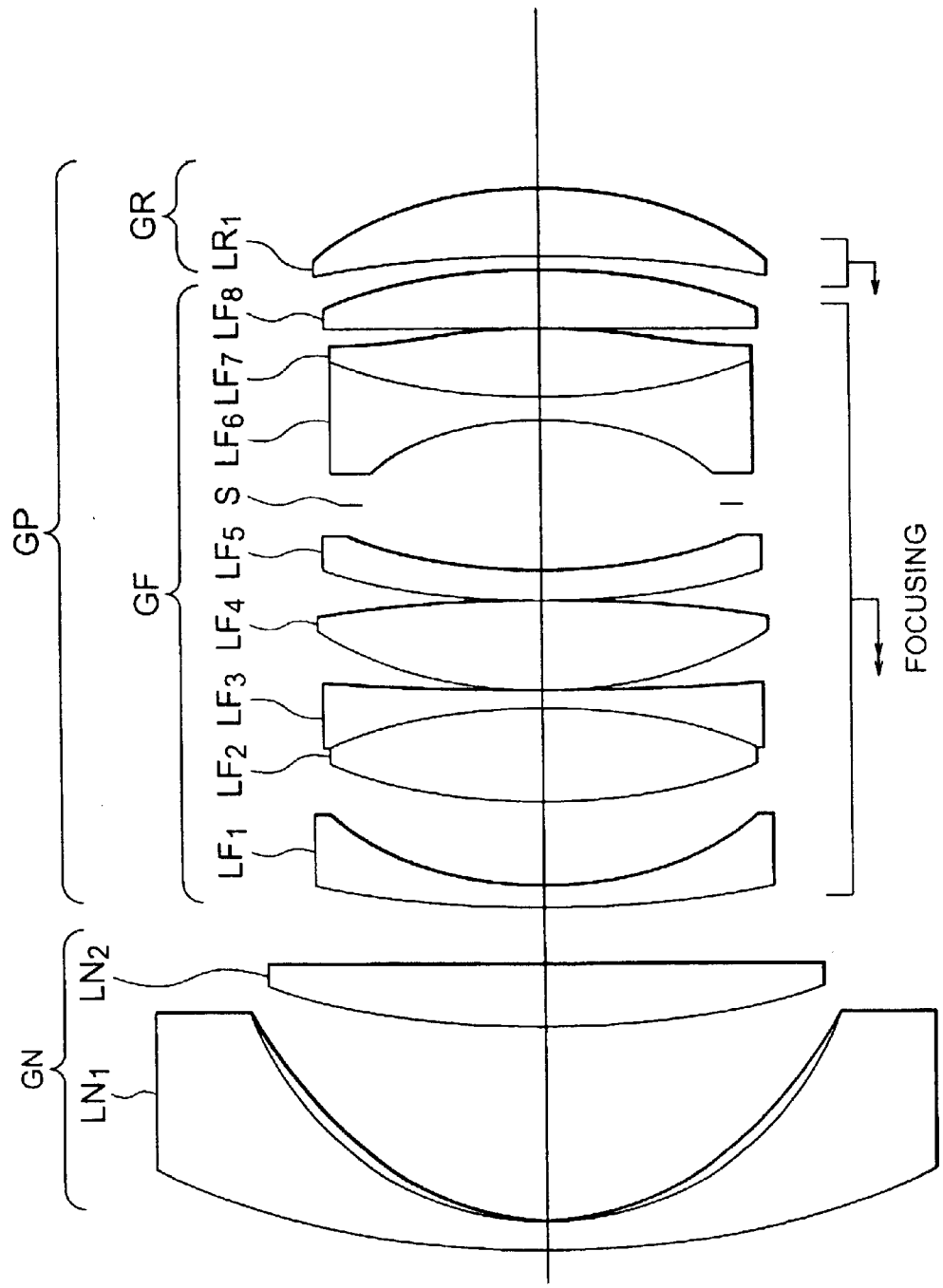
FIG. 1 is a diagram showing the lens arrangement of a large aperture super wide-angle lens system according to Example 1 of the present invention together with movement of lens groups upon focusing.

In the optical design of an objective lens system including a photographic lens system, the most difficult problem is to satisfy both a large angle of view and a large aperture at the same time. It is simply that all Seidel's aberrations should be thoroughly corrected. Because of the difficulty, a lens system having a large aperture of f/1.4 and an angle of view of $2\omega = 94°$ or more has scarcely been proposed in patent applications.

The present invention developed a lens system having never existing specifications described above as a large aperture, super wide-angle lens system having compactness for general use, securing a sufficient peripheral quantity of light, having high optical performance, and using an aspherical surface having high productivity with current production technology.

The basic construction of the present invention is going to be explained first. The lens system according to the present invention is a so-called retrofocus type wide-angle lens system constructed by a divergent negative lens group and a convergent positive lens group. The lens system of the present invention has the construction that a wide converter having negative refractive power (which corresponds to a negative lens group GN) is arranged to the object side of a retrofocus type master lens (which corresponds to a positive lens group GP) having sufficient wide-angle and refractive power.

In a large aperture, retrofocus type wide-angle lens having rear-focusing mechanism, a modified triplet type or a Gauss type are generally used as a master lens. Therefore, the master lens has not had the construction further multiplying a retrofocus ratio, which is defined as the ratio of the back focal length to the focal length.

However, in order to widen the angle of view in the conventional construction, since the wide converter portion is allotted heavy power distribution, it is impossible for the conventional construction to reach a design solution with high optical performance.

Accordingly, the present invention uses a retrofocus type wide-angle lens having a relatively strong retrofocus ratio even in the master lens portion.

As a result, the present inventor has reached a design solution being relatively compact for the specifications, capable of using common attachment size, having high optical performance.

As described above, it is the main technical problem for a lens system having extremely large angle of view to control close-range aberration variation.

Moreover, if the aperture is extremely large, acceptable amounts of remnant aberrations become exceptionally small. Accordingly, the difficulty in correcting close-range aberration variation in addition to the difficulty in improving optical performance upon focusing at infinity makes it further difficult to accomplish a lens system having the said specifications.

Consequently, the inventor has developed a close-range aberration correction system (floating adjustment) having the basic optical structure of the present invention suitable for a super wide-angle lens system.

Generally, a close-range aberration correction system is that when focusing at close object, a specific lens separation (a floating separation) is decreased. However, by introducing a suitable power arrangement, locating aspherical surfaces at proper positions, and arranging an adequate floating separation, the close-range aberration correction system according to the present invention is operated such that when focusing at close object, the floating separation is increased. Therefore, a close-range aberration correction system for satisfactorily suppressing close-range aberration variation has been accomplished.

A super wide-angle lens system according to the present invention includes, in order from an object, a negative lens group GN having negative refractive power which is fixed upon focusing, and a positive lens group GP having positive refractive power as a whole which is moved upon focusing. The positive lens group GP includes a front lens group GF having an aperture stop and a rear lens group GR having positive refractive power. Focusing at a close object is carried out by moving the front lens group GF and the rear lens group GR with different moving amounts to the object side. The following conditional expression (1) is satisfied:

$$0.1 < XR/XF < 1.0 \qquad (1)$$

where XF and XR denote the moving amounts of the front lens group GF and the rear lens group GR, respectively, when focusing at an any close object.

The following conditional expression (2) is preferably satisfied:

$$0.1 < |FR/FF| < 5.2 \qquad (2)$$

where FF denotes the focal length of the front lens group GF, and FR denotes the focal length of the rear lens group GR.

The following conditional expression (3) is also preferably satisfied:

$$1.0 < -FN/FP < 5.0 \qquad (3)$$

where FN denotes the focal length of the negative lens group GN, and FP denotes the focal length of the positive lens group GP.

The negative lens group GN may include at least one negative lens element and at least one positive lens element locating to the image side of the negative lens element. The negative lens element has an aspherical surface facing to a concave surface side. When the aspherical surface is expressed by the following expression:

$$X(y) = (y^2/r0)/\left[1 + (1 - \kappa \cdot y^2/r0^2)^{1/2}\right] +$$
$$C3 \cdot |y^3| + C4 \cdot y^4 + C6 \cdot y^6 + C8 \cdot y^8 +$$
$$C10 \cdot y^{10} + C12 \cdot y^{12} + C14 \cdot y^{14},$$

the following conditional expression (4) is satisfied:

$$-1.0 < \kappa < 1.0 \qquad (4)$$

where X(y) denotes the displacement (sag amount) in the optical axis direction from the tangent plane of the vertex of the aspherical surface at the height y from the optical axis in a vertical direction relative to the optical axis to the aspherical surface, r0 denotes the reference radius of curvature, κ denotes the conical coefficient, Cn denotes an n-th order aspherical coefficient.

The front lens group GF may include a negative lens element located to the object side of the aperture stop. The negative lens element has an aspherical surface including a $3^{rd}$ order aspherical coefficient C3. When the aspherical surface is expressed by the following expression:

$$X(y) = (y^2/r0)/\left[1 + (1 - \kappa \cdot y^2/r0^2)^{1/2}\right] +$$
$$C3 \cdot |y^3| + C4 \cdot y^4 + C5 \cdot |y^5| +$$
$$C6 \cdot y^6 + C7 \cdot |y^7| + C8 \cdot y^8 +$$
$$C10 \cdot y^{10} + C12 \cdot y^{12},$$

the following conditional expression (5) is satisfied:

$$1.0 \times 10^{-6} < |C3| < 1.0 \times 10^{-2} \qquad (5).$$

It is preferable that the negative lens element having an aspherical surface locating the most object side of the negative lens group GN is a hybrid aspherical lens composed of a glass material and a resin material, and that the following conditional expression (6) is satisfied:

$$0.0015 < (dmax - d0)/F0 < 0.5 \qquad (6)$$

where d0 denotes the thickness along the optical axis of the resin material forming the aspherical surface, dmax denotes the thickness of the resin material in the direction of the optical axis where the thickness becomes maximum within the effective aperture, and F0 denotes the focal length of the entire super wide-angle lens system.

Then, conditional expressions are going to be explained below.

Conditional expression (1) defines an appropriate range of variation in the floating separation. When the ratio XR/XF exceeds the upper limit of conditional expression (1), the moving amounts of the front lens group GF and the rear lens group GR, carrying out close-range aberration correction upon focusing, become the same. And then, reversing the amounts, the moving amount of the rear lens group GR becomes larger than that of the front lens group GF, so that the floating separation becomes narrow when focusing at close object. As described above, in an optical system having introduced a suitable power arrangement, and having located aspherical surfaces at proper positions as in the present invention, variations in curvature of field and astigmatism rather increase. The above-described aberrations move in positive direction upon focusing close object, resulting in degradation of optical performance. This is disagreeable.

When the upper limit of conditional expression (1) is set to 0.94, it is more preferable that even better optical performance of the present invention can be expected.

On the other hand, when the ratio falls below the lower limit of conditional expression (1), the moving amount of the rear lens group GR becomes too small in comparison with that of the front lens group GF, so that close-range aberration correction cannot be carried out properly. In particular, in an optical system adopting a suitable power arrangement and aspherical surfaces at proper positions such as in the present invention, variations in curvature of field and astigmatism rather increase. The above-described aberrations move in negative direction upon focusing close object, resulting in degradation of optical performance. This is disagreeable.

When the lower limit of conditional expression (1) is set to 0.16, better aberration correction can be expected. When the lower limit of conditional expression (1) is set to 0.23 or more, it is more preferable that even better optical performance of the present invention can be expected.

When carrying out close-range aberration correction, the moving ratio of the front lens group GF to the rear lens group GR, which provides good optical performance, is not a value such as a local maximum/minimum but a value having a permissible range. Accordingly, the upper limit, the lower limit, and the best value (the most suitable value) of the moving ratio which provide preferable close-range aberration correction are shown in examples of the present invention.

Although each example of the present invention has the construction that each lens group is moved linearly, each lens group may be moved nonlinearly such that the best moving ratio with respect to aberration correction is selected at each object distance.

Conditional expression (2) defines an appropriate range of the power ratio of the front lens group GF to the rear lens group GR, which are moved while correcting close-range aberration upon focusing. This is for providing stable good optical performance from focusing at infinity to focusing at close object. The proper power arrangement of the front lens group GF and the rear lens group GR provides good effect on correcting spherical aberration and upper coma when focusing at infinity as well as on-axis aberrations and off-axis aberrations when focusing at close object. Accordingly, it is desirable to set power balance within the most suitable range.

When the ratio |FR/FF| exceeds the upper limit of conditional expression (2), the refractive power of the front lens group GF becomes excessively strong in comparison with that of rear lens group GR. In the case of the present invention particularly, it is not desirable that correction of curvature of field becomes worse. The serious lack of power balance between the front lens group GF and the rear lens group GR results in reducing close-range aberration correction effect. At last, the appropriate range of conditional expression (1) is no longer satisfied, so that it is undesirable.

When the upper limit of conditional expression (2) is set to 3.0, better aberration correction can be expected. When the upper limit of conditional expression (2) is set to 1.0, it is more preferable that even better optical performance of the present invention can be expected.

On the other hand, when the ratio falls below the lower limit of conditional expression (2), the refractive power of the rear lens group GR becomes excessively strong in comparison with that of front lens group GF. In the case of the present invention particularly, it is not desirable that corrections of spherical aberration and upper coma become worse. When the rear lens group GR is composed of a single positive lens element or a fewer number of lens elements as shown in the examples of the present invention, it is not desirable that correction of and variation in lateral chromatic aberration becomes worse. As sama as the above case exceeding the upper limit, the serious lack of power balance between the front lens group GF and the rear lens group GR results in reducing close-range aberration correction effect. At last, the appropriate range of conditional expression (1) is no longer satisfied, so that it is undesirable.

When the lower limit of conditional expression (2) is set to 0.15, better aberration correction can be expected. When the lower limit of conditional expression (2) is set to 0.2 or more, it is more preferable that even better optical performance of the present invention can be expected.

Conditional expression (3) defines an appropriate range of the focal length ratio of the negative lens group GN corresponding to the wide-converter portion to that of the positive lens group GP corresponding to the master lens group. As described above, in order to obtain a lens design solution of a well corrected, large aperture super wide-angle lens system having compactness for common use, it is important for the master lens portion to be a retrofocus type wide-angle lens having a relatively strong retrofocus ratio so as to lighten the burden of power distribution imposed on the wide-converter portion (the negative lens group GN).

When the focal length ratio exceeds the upper limit of conditional expression (3), it means that the refractive power of the positive lens group GP becomes excessively strong in comparison with that of the negative lens group GN, or the refractive power of the negative lens group GN becomes excessively weak in comparison with that of the positive lens group GP. In the former case, the focal length of the master lens group becomes short. Accordingly, the retrofocus ratio has to be increased so as to secure back focal length. Consequently, various aberrations become worse and the speed (aperture) of the lens system cannot be secured, so that it is undesirable. In the latter case, the negative lens group GN becomes large and the whole lens system becomes large, so that it is undesirable.

When the upper limit of conditional expression (3) is set to 4.0, better aberration correction and compactness can be expected. When the upper limit of conditional expression (3) is set to 3.0, it is more preferable that even better optical performance of the present invention can be expected.

On the other hand, when the ratio falls below the lower limit of conditional expression (3), it means that the refractive power of the positive lens group GP becomes excessively weak in comparison with that of the negative lens group GN or the refractive power of the negative lens group GN becomes excessively strong in comparison with that of the positive lens group GP. In the former case, the master lens group becomes large and the retrofocus ratio becomes small. Accordingly, the burden of correction of off-axis aberration imposed on the negative lens group GN becomes heavy, so that correction of off-axis aberration becomes worse. In the latter case, correction of off-axis aberration becomes worse, the number of lens elements increases, the thickness of each lens element increases, and the diameter of the front lens group becomes large, so that it is undesirable.

When the lower limit of conditional expression (3) is set to 1.5, better aberration correction and compactness can be expected. When the lower limit of conditional expression (3) is set to 2.0 or more, it is more preferable that even better optical performance of the present invention can be expected.

In the present invention, in order to realize high optical performance and compactness, it is desirable to use distinctive aspherical surfaces in the lens system. In a large aperture super wide-angle lens system, in particular, it is desirable that at least one aspherical surface is used in the negative lens group GN where the difference between the height H of the ray emanated from an on-axis object and having the largest numerical aperture (on-axis parallel ray, Rand ray) and the height Hbar of the off-axis ray becomes maximum. The aspherical surface is utilized for correcting curvature of field, lower coma, and distortion, securing the number of lens elements in the negative lens group to be minimum, and preventing the lens elements from becoming thick and the diameter of the front lens group from becoming large. Moreover, the characteristic of the aspherical surface is that when the surface is expressed by the aforementioned aspherical expression, aberration correction can be carried out meticulously by using higher order ($12^{th}$ and $14^{th}$ order) aspherical coefficient and accurately using the conical coefficient $\kappa$.

Then, the effect of $\kappa$ is going to be explained. The first term of the aforementioned aspherical expression is expanded in a power series and shown only aspherical terms in connection with $\kappa$, are shown as follows:

$$X(y) = (1/2) \cdot (C0 + 2 \cdot C2)y^2 -$$
$$(1/8) \cdot (C0^3 \cdot \kappa + 8 \cdot C4)y^4 +$$
$$(1/16) \cdot (C0^5 \cdot \kappa^2 + 16 \cdot C6)y^6 + \ldots$$

where C0 is equal to 1/r0, X(y) denotes the displacement (sag amount) in the optical axis direction from the tangent plane of the vertex of the aspherical surface at the height y from the optical axis in a vertical direction relative to the optical axis to the aspherical surface, r0 denotes the reference radius of curvature, $\kappa$ denotes the conical coefficient, Cn denotes an n-th order aspherical coefficient.

It is understood from the above expression that $\kappa$ effects aspherical coefficient of $4^{th}$ order or more. By positively using $\kappa$ for correcting aberrations, only one term of $\kappa$ obtains almost same effect as using aspherical coefficients from low order to very high order. Particularly in the present invention, radius of curvature (power) of lower order part (in the vicinity of the optical axis) is made to be strong and that of higher order part (apart from the optical axis, in the vicinity of the maximum effective aperture) is made to be extremely weak. In this case, it is desirable that the aspherical surface has the value of $\kappa$ between $-1$ and $+1$, that is, an aspherical surface based of an ellipsoid, a paraboloid, or a hyperboloid. Arranging $\kappa$ to an appropriate value helps for correcting distortion, lower coma, and astigmatism.

Moreover, a higher order term of $12^{th}$ order or more takes important effect to realize an optical system having an extremely wide angle of view like the present invention. In the present invention, an aspherical surface is introduced at an image side surface of the first lens element where off-axis aberrations can be corrected effectively. Therefore, the height Hbar of each off-axis ray corresponding to each image height is sufficiently separated with each other and the width of each bundle of ray is small. Accordingly, each bundle of ray corresponding to each image height can be corrected independently with each other by controlling only high order terms. As described above, aberration corresponding to peripheral ray that cannot have been corrected well can be corrected excellently by effectively using high order terms of the aspherical coefficient.

Accordingly, an appropriate setting of high order terms is effective for improving peripheral image and can keep distortion, lower coma, and astigmatism in the very periphery satisfactory.

Moreover, optimum arrangement of aspherical surfaces in consideration of H and Hbar, and control of $\kappa$ and high order terms in addition to ordinal even-order terms of the aspherical coefficient make it possible to provide better correction of aberrations. Therefore, the present invention can provide an optical system with reduced number of lens elements in the lens system and with compactness by reducing the number of positive lenses used in the lens groups.

Conditional expression (4) defines an appropriate range of the conical coefficient $\kappa$. When the value exceeds the upper limit of conditional expression (4), the reference surface in the vicinity of the optical axis varies from a sphere to a prolate ellipsoid. This means an aspherical surface whose radius of curvature near the optical axis is weak and becomes extremely strong in the periphery. In the aspherical surface according to the present invention, correction of off-axis aberration becomes worse, so that it is undesirable.

On the other hand, when the value falls below the lower limit of conditional expression (4), on the contrary to the above-described case where the value exceeds the upper limit, it means an aspherical surface whose radius of curvature near the optical axis becomes extremely strong and becomes excessively weak in the periphery. Although the shape is preferable for correcting aberrations, drastic change in shape is not good for correcting aberrations or may reach a design solution which is actually unable to manufacture, so that it is undesirable. In using the aspherical surface as in the present invention, it means that negative power of an aspherical surface becomes drastically weak in the periphery. Accordingly, it tends to introduce a drop in peripheral quantity of light and an increase in diameter of front lens group, so that it is not desirable.

Furthermore, in the present invention, it is preferable to introduce an aspherical surface with a $3^{rd}$ order term of the aspherical coefficient expressed by the above-mentioned aspherical expression to a negative lens locating to the object side of the aperture stop in the positive lens group GP. Odd-order term in the aspherical surface can represent a function which is difficult to be represented by finite number power series expansion using only even-order terms. By applying the shape to the aspherical surface, effect of aberration correction which has never been obtained can be obtained.

Here, the aspherical surface, in particular, the relation between the odd-order term of the aspherical coefficient and aberration correction is explained. Generally, since the optical system is rotationally symmetrical, an aspherical surface is expressed by series of even-order terms. However, the present invention introduces odd-order terms into the series to carry out aberration correction effectively. When the aspherical surface is considered in the meridional plane, a surface having odd-order terms differs in sag amount X in accordance with the sign of image height y. Accordingly, it may be thought that the symmetry is not satisfied in this case. However, when a Cartesian coordinates (X, Y, Z) whose X coordinate axis is the optical axis is thought that $\rho=(Y^2+Z^2)^{1/2}$, the symmetry is satisfied because the sign is equal.

The $3^{rd}$ order aberration is generated in an aspherical surface having even-order terms of aspherical coefficient as well as in a spherical surface because the refractive surface is expressed by even-order terms of p as shown in the following expression (A):

$$X=C2\rho^2+C4\rho^4+C6\rho^6+\ldots \quad (A).$$

Accordingly, when a refractive surface includes odd-order terms, it means that even-order aberration such as a $2^{nd}$ order aberration, a $4^{th}$ order aberration, and the like, which have not existed, are generated. When an aspherical surface is a single curve surface, spherical aberration corresponds to the aspherical coefficient. Accordingly, an aberration correction effect which has never been obtained in spherical plane can be obtained by introducing odd-order terms of aspherical coefficient.

Generally, X can be expressed in the following expression (B):

$$X=\rho^2\cdot[1/(2r0)]+C4\rho^4+C6\rho^6+\ldots \quad (B).$$

Adding $3^{rd}$ order term C3 and $5^{th}$ order term C5 to the above expression (B), the following expression (C) is derived:

$$X=\rho^2[1/(2r0)]+C3\rho^3+C4\rho^4+C5\rho^5+C6\rho^6+\ldots \quad (C).$$

Therefore, when $2^{nd}$ order spherical aberration ($\Delta Yk^*$) is derived, it is represented by the following expression (D):

$$\Delta Yk^* = 3(nk^*\cdot uk^*)^{-1}[\Sigma(ni^*-ni)C3i\cdot Hi^3]R^2 \quad (D)$$

where n denotes the refractive index, u denotes an angle between the incident light ray and the optical axis, the asterisk (*) denotes the amount which is in the exit side of the lens surface, C3i denotes $3^{rd}$ order term of the aspherical coefficient of the i-th lens surface, H denotes a height of the incident ray, R denotes the radius of the entrance pupil, and $\Sigma$ denotes a summation sign which means the summation from i=1 to i=k.

Accordingly, the $3^{rd}$ order spherical aberration is proportional to the $4^{th}$ power of the incident height and the $3^{rd}$ power of the radius of the entrance pupil. However, the $2^{nd}$ order spherical aberration is proportional to the $3^{rd}$ power of the incident height and the $2^{nd}$ power of the radius of the entrance pupil. Therefore, lower order aberrations which have been difficult to be corrected can be corrected by introducing the $3^{rd}$ order term of the aspherical coefficient. Accordingly, it becomes possible to further increase the specification and optical performance.

Although only spherical aberration is explained above, other aberrations such as distortion, coma, and the like can be corrected in the same manner.

In the present invention, an aspherical surface is used in a negative lens element of the front lens group GF in the positive lens group GP locating to the object side of the aperture stop. By using an aspherical surface in which the $3^{rd}$ order term C3 of the aspherical coefficient as described above is introduced, various aberrations such as spherical aberration, lower coma, and distortion are well corrected in balance. In a large aperture super wide-angle lens system like the present invention, when an aspherical surface is introduced in a negative lens element of the front lens group GF locating to the object side of the aperture stop, lower order distortion can be corrected well. The inclination (differential) of distortion relative to the image height has been a wave like shape (lower image height shows a barrel shape distortion and higher image height portion shows a pincushion shape distortion). However, this is remarkably improved by introducing $3^{rd}$ order term C3. Similarly, aberration correction effect of coma and spherical aberration is high and, in particular, lower order aberration can be corrected well. Therefore, the negative aberration of relatively low portion of image height produced by increasing the aperture is corrected, so that the circle of least confusion can be smaller.

In the present invention, it is more effective for the aspherical surface to be introduced to a lens surface having large angle of deviation a relative to the on-axis parallel ray in order to be advantageous for making large aperture. Accordingly, it is desirable to introduce the aspherical surface to a concave surface of the said negative lens element.

Conditional expression (5) defines an appropriate range of the $3^{rd}$ order term C3 of the aspherical coefficient introduced in the negative lens element in the front lens group GF of the positive lens group GP locating to the object side of the aperture stop. When the aspherical surface is expressed by the expression defined by the present invention, conditional expression (5) is necessary for satisfactorily correcting distortion, coma, and spherical aberration.

When the value exceeds the upper limit of conditional expression (5), it means that the $3^{rd}$ order term of the aspherical coefficient becomes too large. In particular, spherical aberration of relatively low portion of the incident height varies largely to the positive side under the influence of the $2^{nd}$ order spherical aberration. As a result, inclination (differential) of spherical aberration becomes large and a so-called "undulation" becomes conspicuous, so that optical performance lowers. It is undesirable. Moreover, various aberrations such as coma, and distortion become overcorrected to be even worse.

When the upper limit of conditional expression (5) is set to $1\times 10^{-3}$ or less, better aberration correction can be expected. When the upper limit of conditional expression (5) is set to $5\times 10^{-4}$, it is more preferable that even better optical performance of the present invention can be expected.

On the other hand, when the value falls below the lower limit of conditional expression (5), effect of aberration correction described above becomes less distinctive, so that optical performance of the present invention cannot be expected.

When the lower limit of conditional expression (5) is set to $5\times 10^{-6}$ or more, better aberration correction can be expected. When the lower limit of conditional expression (5) is set to 1×10$^{-5}$ or more, it is more preferable that even better optical performance of the present invention can be expected.

Conditional expression (6) defines an appropriate range of the thickness of the resin material. In consideration of the current manufacturing technique and its manufacturing cost, it is necessary for the aspherical surface to be manufactured giving priority to the productivity and accuracy. In a large aperture super wide-angle lens system like the present invention in particular, difficulty and productivity in manufacturing the aspherical surface become a subject of discussion. In particular, the hybrid type aspherical lens composed of resin and glass materials is most suitable for the aspherical lens in the converter portion (negative lens group GN), which has largest diameter in the whole lens system. When conditional expression (6) is satisfied, facility in processing and production largely improves. Consequently, it becomes easy to secure accuracy, so that stable production becomes possible.

When the ratio (dmax−d0)/f0 exceeds the upper limit of conditional expression (6), the difference in thickness of the resin thickness distribution becomes large. Accordingly, accuracy in processing lowers, so that it is undesirable.

On the other hand, when the ratio falls below the lower limit of conditional expression (6), the effect of designed aspherical surface diminishes, so that sufficient aberration correction becomes impossible. So, it is undesirable.

In the present invention, it is desirable that a cemented aspherical lens constructed by a high power negative lens cemented with a positive lens having an aspherical surface is located to the image side of the aperture stop.

Examples according to the present invention are explained below with reference to accompanying drawings.

EXAMPLE 1

FIG. 1 is a diagram showing the lens arrangement of a large aperture super wide-angle lens system according to Example 1 of the present invention together with movement of lens groups upon focusing.

A large aperture super wide-angle lens system according to Example 1 is composed of, in order from an object, a negative lens group GN having negative refractive power which is fixed upon focusing, and a positive lens group GP having positive refractive power as a whole which is moved upon focusing.

The positive lens group GP has a front lens group GF having an aperture stop S and a rear lens group GR having positive refractive power.

The negative lens group GN is composed of, in order from the object, a composite negative meniscus aspherical lens LN1 having a convex surface facing to the object and an aspherical surface facing to an image constructed by resin and glass materials, and a positive meniscus lens LN2 having a convex surface facing to the object.

The front lens group GF is composed of, in order from the object, a composite negative meniscus aspherical lens LF1 having a convex surface facing to the object and an aspherical surface facing to the image constructed by resin and glass materials, a positive cemented lens constructed by a double convex positive lens LF2 cemented with a double concave negative lens LF3, a double convex positive lens LF4, a negative meniscus lens LF5, an aperture stop S defining an f-number, a cemented negative lens constructed by a double concave negative lens LF6 cemented with a double convex positive lens LF7 having an aspherical surface facing to the image, and a double convex positive lens LF8.

The rear lens group GR is composed of a positive meniscus lens LR1 having a convex surface facing to the image.

Focusing at a close object is carried out by moving the front lens group GF and the rear lens group GR in the positive lens group GP toward the object with an appropriate moving ratio described later. In this case, the closest shooting distance is 0.3 m (magnification is about −0.11).

In Variable Distances upon Focusing shown in tables below, each distance at respective 5 positions (1-POS through 5-POS) shows the value at the best moving ratio.

Various values associated with Example 1 are listed in Table 1. In Table 1, surface number is a lens surface number counted in order from the object, r denotes radius of curvature, d denotes distance along the optical axis between the adjacent lens surfaces, V denotes Abbe number, and n denotes refractive index at d-line (λ=587.6 nm). F0 denotes the focal length, β denotes an imaging magnification, FNO denotes the f-number, and 2ω denotes an angle of view. A diamond mark (♦) is attached to an aspherical surface and a paraxial radius of curvature is shown in r column of the aspherical surface.

In all Examples shown below, the same reference symbols as Example 1 are used in various values and aspherical surfaces. The indication "E-n" shown in aspherical coefficients means "×10$^{-n}$".

Regarding 5 positions (1-POS through 5-POS), 1-POS denotes the state when the system is focused at infinity, 2-POS denotes the state when the system is focused at an object point with magnification β=−0.02500 (=−1/40) by using the lower limit value (0.065 in Example 1) of the moving ratio, 3-POS denotes the state when the system is focused at an object point with magnification β=−0.02500 (=−1/40) by using the most suitable moving ratio (0.075 in Example 1), 4-POS denotes the state when the system is focused at an object point with magnification β=−0.02500 (=−1/40) by using the upper limit value (0.082 in Example 1) of the moving ratio, and 5-POS denotes the state when the system is focused at the closest object point (0.3 m with magnification β=−0.10962 in Example 1).

In Values for Conditional Expressions, values for conditional expression (1) are the vales of 2-POS (lower limit: 0.065 in Example 1), 4-POS (upper limit: 0.082 in Example 1), and 3-POS (best value: 0.075 in Example 1) when the system is focused at an object point with magnification β=−0.02500.

The above described explanations for 5 positions (of Variable Distances) and values for conditional expression (1) are applied to all Examples shown below.

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used.

TABLE 1

(Specifications)

F0 = 20.62 mm
2ω = 94.52°
FNO = 1.439

(Lens Data)

| surface number | r | d | ν | n |
|---|---|---|---|---|
| 1) | 75.1005 | 2.0000 | 46.58 | 1.804000 |
| 2) | 23.5000 | 0.2000 | 38.73 | 1.553070 |
| 3) ♦ | 18.5837 | 14.8000 | | 1.000000 |
| 4) | 61.9662 | 5.0000 | 23.78 | 1.846660 |
| 5) | 519.6648 | D1 | | 1.000000 |
| 6) | 86.2206 | 1.7000 | 49.61 | 1.772500 |
| 7) | 26.0700 | 0.0500 | 38.73 | 1.553070 |
| 8) ♦ | 24.7639 | 6.5500 | | 1.000000 |
| 9) | 39.0253 | 8.0000 | 70.24 | 1.487490 |
| 10) | −42.1202 | 1.5000 | 58.54 | 1.651600 |
| 11) | 271.4842 | 0.1000 | | 1.000000 |
| 12) | 33.8661 | 7.1500 | 40.94 | 1.806100 |
| 13) | −106.4412 | 0.1000 | | 1.000000 |
| 14) | 58.4075 | 2.0000 | 70.24 | 1.487490 |
| 15) | 38.8724 | 5.5000 | | 1.000000 |
| 16> | | 7.0000 | | 1.000000 Aperture Stop S |
| 17) | −22.1157 | 1.5000 | 23.78 | 1.846660 |
| 18) | 42.2974 | 5.5000 | 49.18 | 1.740144 |
| 19) ♦ | −49.5614 | 0.1000 | | 1.000000 |
| 20) | 2239.1420 | 5.0000 | 49.61 | 1.772500 |
| 21) | −43.8031 | D2 | | 1.000000 |
| 22) | −95.5595 | 5.5000 | 49.61 | 1.772500 |
| 23) | −28.3706 | BF | | 1.000000 |

(Aspherical Surface Data)

Surface Number 3

κ = 0.4555
C3 = −0.12897E−05
C4 = −3.55915E−06
C6 = 1.16553E−08
C8 = −4.93137E−11
C10 = 7.22449E−14
C12 = −0.22890E−16
C14 = −0.58611E−19

Surface Number 8

κ = 0.7061
C3 = 0.16426E−04
C4 = −2.85728E−06
C5 = 0.86437E−07
C6 = 3.28704E−09
C7 = 0.77911E−10
C8 = −5.94481E−11
C10 = 8.51567E−14
C12 = −0.21538E−16

Surface Number 19

κ = 4.5920
C4 = 2.25914E−05
C6 = 2.95104E−08
C8 = −3.04872E−11
C10 = 1.92279E−14
C12 = −0.58286E−16
C14 = 0.21866E−18

(Variable Distances upon Focusing)

| | 1-POS | 2-POS | 3-POS | 4-POS | 5-POS |
|---|---|---|---|---|---|
| F0 &β | 20.60000 | −0.02500 | −0.02500 | −0.02500 | −0.10962 |
| D0 | ∞ | 813.8674 | 812.6091 | 811.9113 | 177.1890 |
| D1 | 4.78062 | 3.93155 | 4.04436 | 4.10699 | 1.46722 |
| D2 | 0.78582 | 1.08299 | 0.96989 | 0.90707 | 1.61417 |

TABLE 1-continued

| BF | 37.99456 | 38.54646 | 38.54676 | 38.54694 | 40.47961 |
|---|---|---|---|---|---|

(Values for Conditional Expressions)

(1) XR/XF = 0.65–0.82 (best value = 0.75)
(2) |FR/FF| = 0.672
(3) −FN/FP = 2.52
(4) κ = 0.4555
(5) |C3| = 0.16426E−04
(6) (dmax−d0)/F0 = 0.0589

The moving ratio upon focusing defined by conditional expression (1) is not limited to only one design solution and has an appropriate range which provides good optical performance. This Example shows the appropriate range of the moving ratio.

Figure 2:
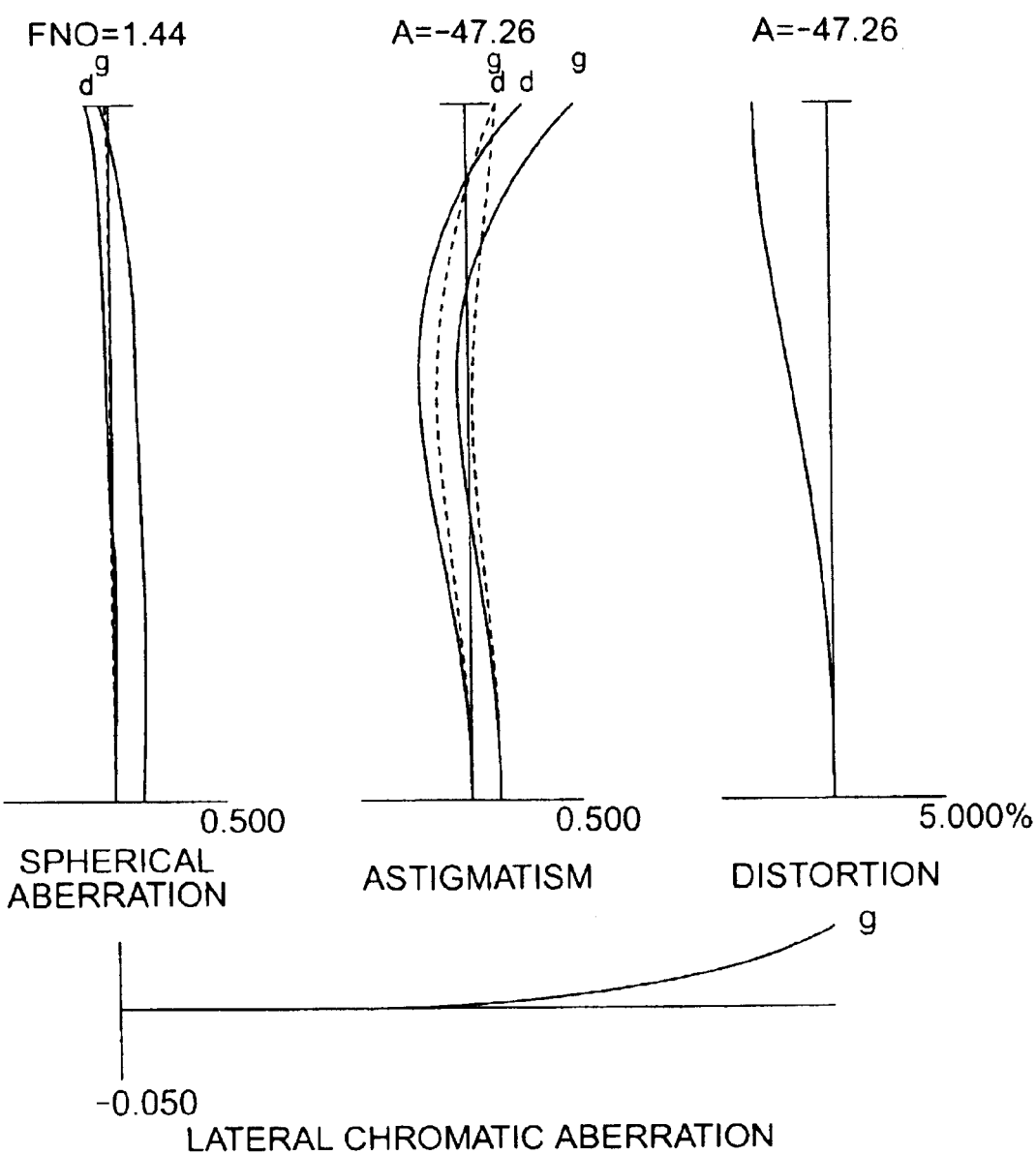
FIG. 2 graphically shows various aberrations of the lens system according to Example 1 when the system is focused at infinity.

FIG. 2 graphically shows various aberrations of the lens system according to Example 1 when the system is focused at infinity (1-POS).

Figure 3:
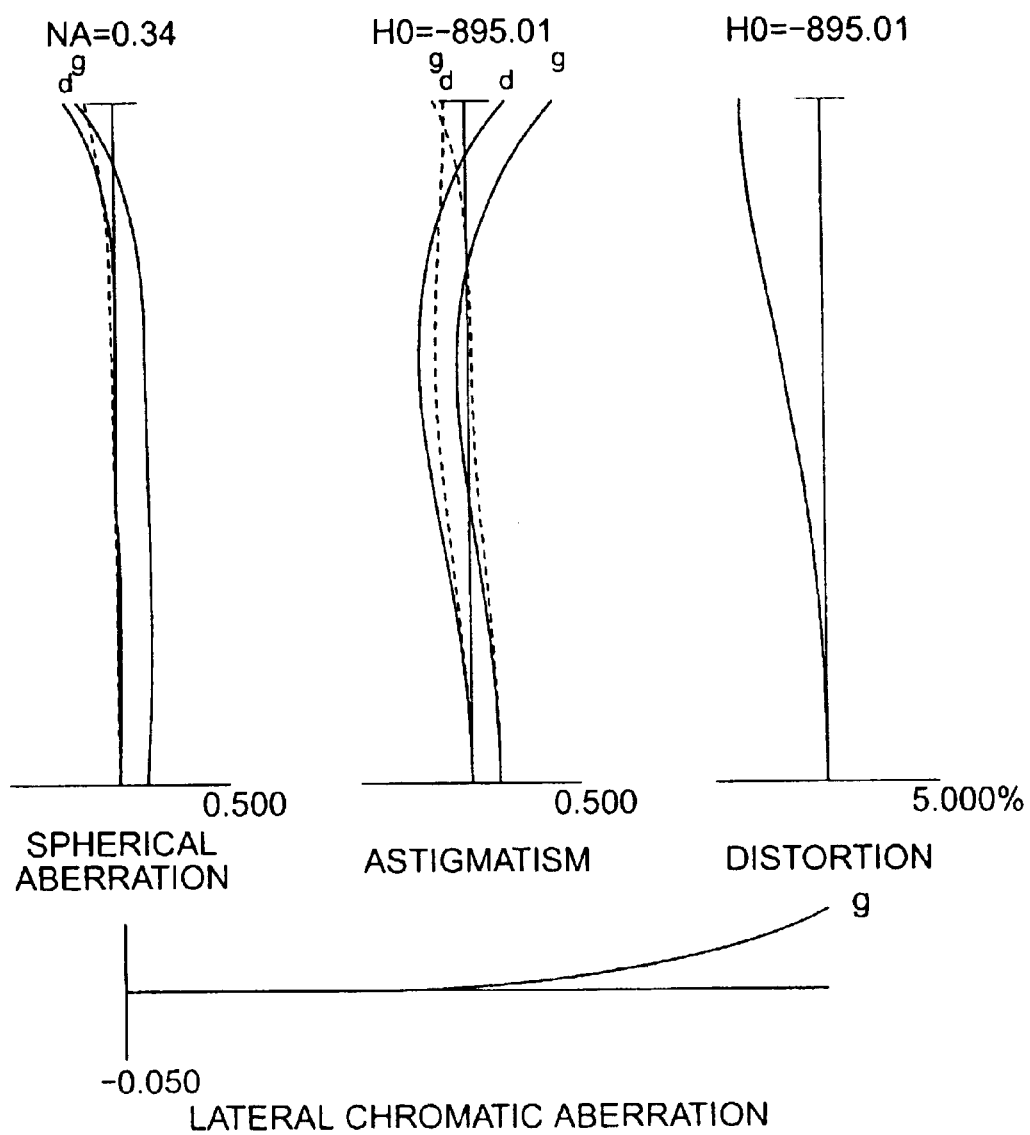
FIG. 3 graphically shows various aberrations of the lens system according to Example 1 when the system is focused at an object point with magnification $\beta = -1/40$ by using the lower limit value of the moving ratio of conditional expression (1).

FIG. 3 graphically shows various aberrations of the lens system according to Example 1 when the system is focused at an object point with magnification β=−1/40 by using the lower limit value (0.65) of the moving ratio of conditional expression (1) (2-POS).

Figure 4:
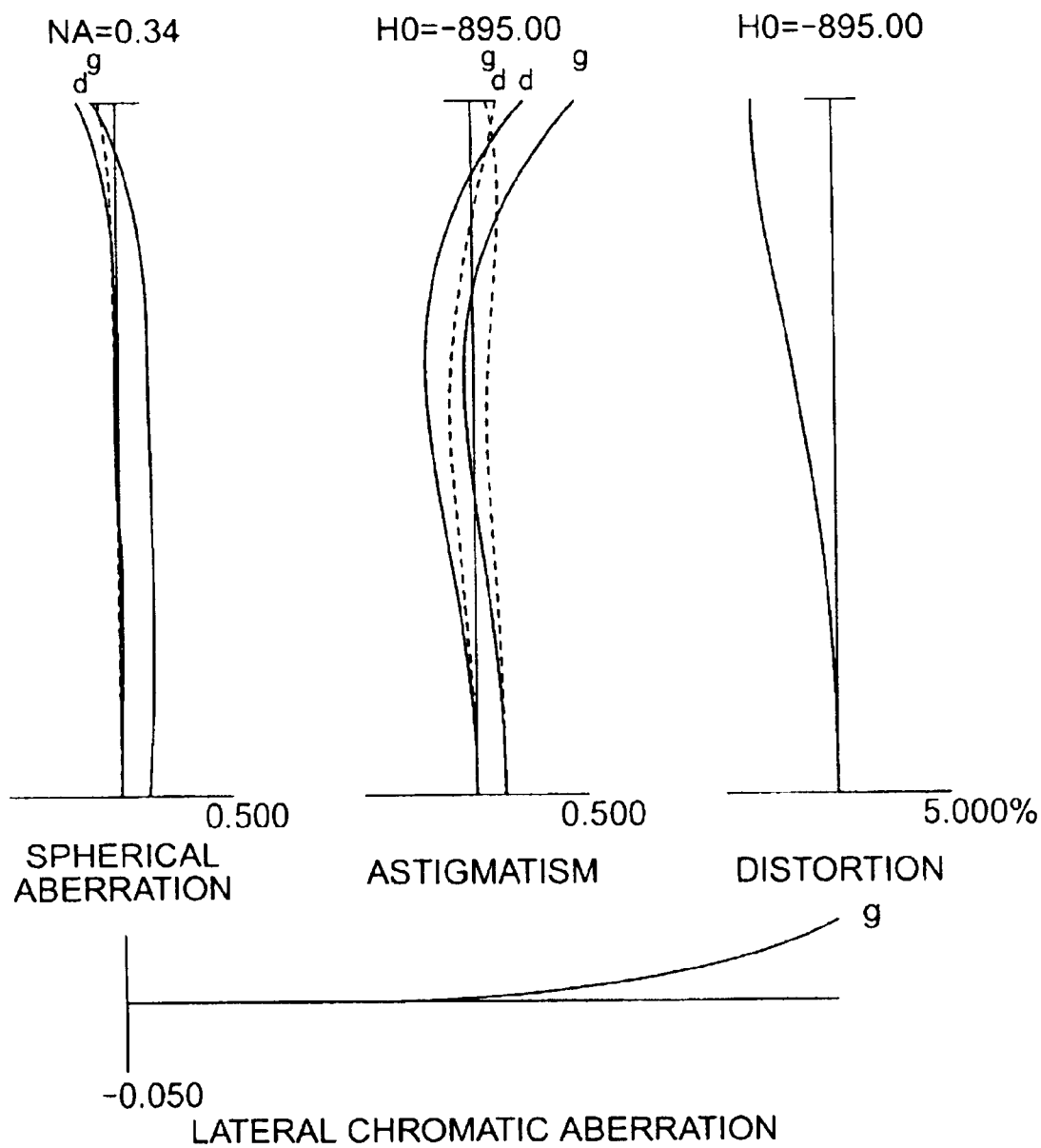
FIG. 4 graphically shows various aberrations of the lens system according to Example 1 when the system is focused at an object point with magnification $\beta = -1/40$ by using the most suitable moving ratio (best value) of conditional expression (1).

FIG. 4 graphically shows various aberrations of the lens system according to Example 1 when the system is focused at an object point with magnification β=−1/40 by using the most suitable moving ratio (0.75: best value) of conditional expression (1) (3-POS).

Figure 5:
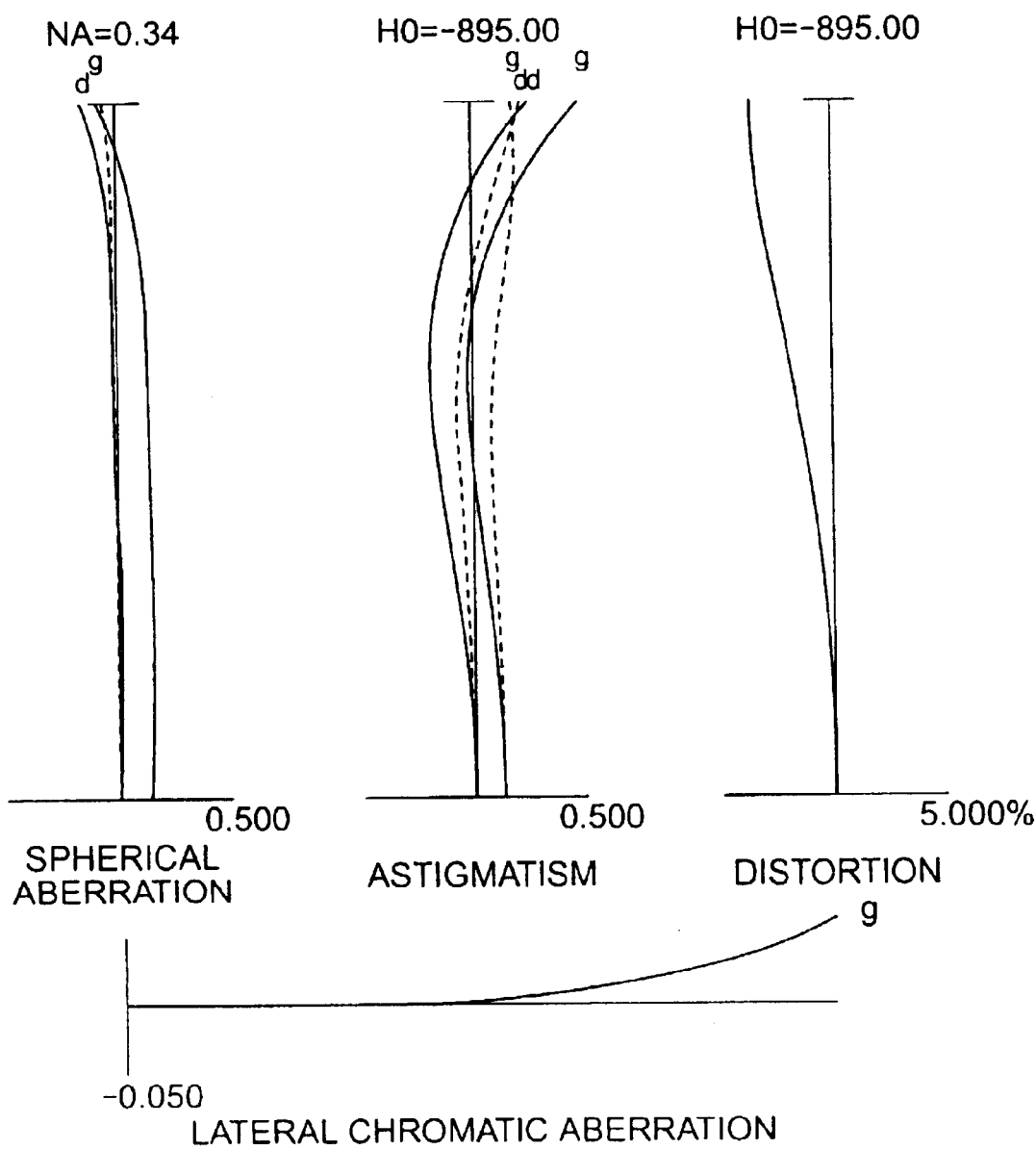
FIG. 5 graphically shows various aberrations of the lens system according to Example 1 when the system is focused at an object point with magnification $\beta = -1/40$ by using the upper limit value of the moving ratio of conditional expression (1).

FIG. 5 graphically shows various aberrations of the lens system according to Example 1 when the system is focused at an object point with magnification β=−1/40 by using the upper limit value (0.82) of the moving ratio of conditional expression (1) (4-POS).

In graphs showing various aberrations in FIG. 2 through FIG. 5, NA denotes the numerical aperture, which is expressed NA=1/(2×FNO). FNO denotes an f-number, A denotes a half angle of view ω, H0 denotes an object height, d and g denote aberration curves at d-line (λ=587.56 nm) and g-line (λ=435.84 nm), respectively. In the graphs showing spherical aberration a broken line indicates a sine condition. In the graphs showing astigmatism, a solid line indicates a sagittal image plane, and a broken line indicates a meridional image plane.

In all aberration graphs of the following examples, the same denotations are applied.

FIG. 2 shows that off-axis aberrations such as spherical aberration, curvature of field, and astigmatism are corrected satisfactorily.

Result of best design solution is shown in FIG. 4. However, various aberrations shown in FIGS. 3 and 5 also show that close-range aberration variations of spherical aberration, curvature of field, and astigmatism are corrected well.

In addition, since the above described focusing lens group works as a single optical system, the lens group can be used as a so-called vibration reduction lens group. Moreover, the focusing lens group can be used as a shift lens system by shifting from the optical axis.

EXAMPLE 2

Figure 6:
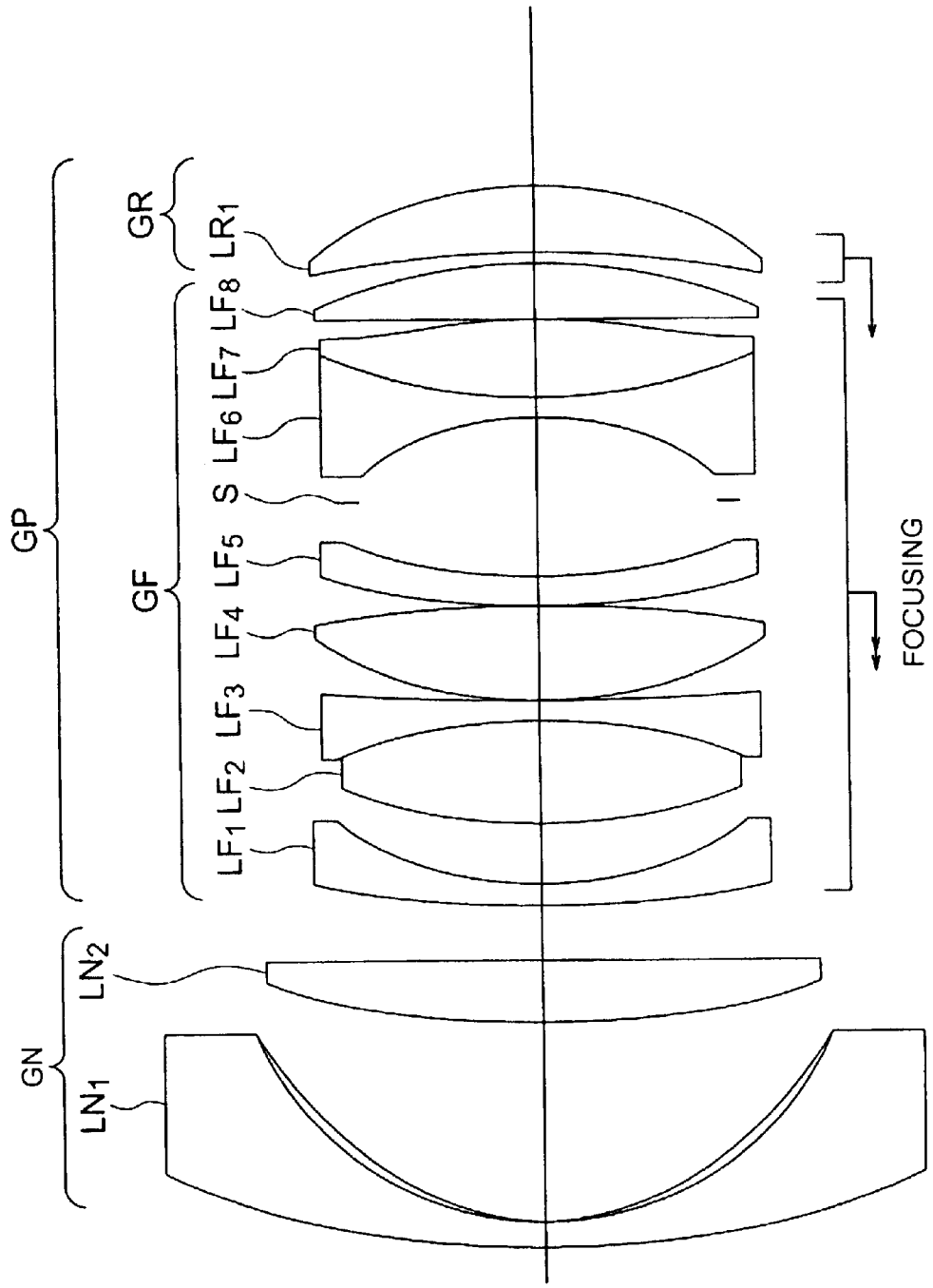
FIG. 6 is a diagram showing the lens arrangement of a large aperture super wide-angle lens system according to Example 2 of the present invention together with movement of lens groups upon focusing.

FIG. 6 is a diagram showing the lens arrangement of a large aperture super wide-angle lens system according to Example 2 of the present invention together with movement of lens groups upon focusing.

A large aperture super wide-angle lens system according to Example 2 is composed of, in order from an object, a negative lens group GN having negative refractive power which is fixed upon focusing, and a positive lens group GP having positive refractive power as a whole which is moved upon focusing.

The positive lens group GP has a front lens group GF having an aperture stop S and a rear lens group GR having positive refractive power.

The negative lens group GN is composed of, in order from the object, a composite negative meniscus aspherical lens LN1 having a convex surface facing to the object and an aspherical surface facing to an image constructed by resin and glass materials, and a positive meniscus lens LN2.

The front lens group GF is composed of, in order from the object, a composite negative meniscus aspherical lens LF1 having a convex surface facing to the object and an aspherical surface facing to the image constructed by resin and glass materials, a positive cemented lens constructed by a double convex positive lens LF2 cemented with a double concave negative lens LF3, a double convex positive lens LF4, a negative meniscus lens LF5, an aperture stop S defining an f-number, a cemented negative lens constructed by a double concave negative lens LF6 cemented with a double convex positive lens LF7 having an aspherical surface facing to the image, and a double convex positive lens LF8.

The rear lens group GR is composed of a positive meniscus lens LR1 having a convex surface facing to the image.

Focusing at a close object is carried out by moving the front lens group GF and the rear lens group GR in the positive lens group GP toward the object with an appropriate moving ratio described later. In this case, the closest shooting distance is 0.3 m (magnification is about −0.11).

In Variable Distances upon Focusing shown in tables below, each distance at respective 5 positions (1-POS through 5-POS) shows the value at the best moving ratio.

Various values associated with Example 2 are listed in Table 2.

TABLE 2

(Specifications)

F0 = 20.62 mm
2ω = 94.90°
FNO = 1.440

(Lens Data)

| surface number | r | d | ν | n |
|---|---|---|---|---|
| 1) | 83.4852 | 2.0000 | 46.58 | 1.804000 |
| 2) | 23.5000 | 0.2000 | 38.73 | 1.553070 |
| 3) ♦ | 18.5981 | 15.0000 | | 1.000000 |
| 4) | 61.9915 | 5.0000 | 23.78 | 1.846660 |
| 5) | 647.4681 | D1 | | 1.000000 |
| 6) | 82.0077 | 1.7000 | 49.61 | 1.772500 |
| 7) | 24.6563 | 0.0500 | 38.73 | 1.553070 |
| 8) ♦ | 23.4135 | 4.8000 | | 1.000000 |
| 9) | 37.0352 | 8.0000 | 70.24 | 1.487490 |
| 10) | −39.0615 | 1.5000 | 58.54 | 1.651600 |
| 11) | 241.0005 | 0.1000 | | 1.000000 |
| 12) | 32.1851 | 7.4000 | 40.94 | 1.806100 |
| 13) | −98.2972 | 0.1000 | | 1.000000 |
| 14) | 56.0008 | 2.0000 | 70.24 | 1.487490 |
| 15) | 36.1865 | 5.5000 | | 1.000000 |
| 16> | | 7.0000 | | 1.000000 |
| | | | | Aperture Stop S |
| 17) | −21.3184 | 1.5000 | 23.78 | 1.846660 |
| 18) | 37.2870 | 6.0000 | 49.18 | 1.740144 |
| 19) ♦ | −47.2671 | 0.1000 | | 1.000000 |
| 20) | 786.4409 | 4.5000 | 49.61 | 1.772500 |
| 21) | −40.9659 | D2 | | 1.000000 |
| 22) | −87.3711 | 5.0000 | 45.37 | 1.796681 |
| 23) | −29.1892 | BF | | 1.000000 |

(Aspherical Surface Data)

Surface Number 3

κ = 0.4480
C3 = −0.25819E−04
C4 = −3.72434E−06
C6 = 1.00676E−08
C8 = −5.03834E−11
C10 = 7.21922E−14
C12 = −0.23465E−16
C14 = −0.58611E−19

Surface Number 8

κ = 0.7165
C3 = 0.24258E−04
C4 = −2.68635E−06
C5 = 0.15255E−06
C6 = 3.55057E−09
C7 = 0.15289E−09
C8 = −6.02803E−11
C10 = 7.66974E−14
C12 = −0.21538E−16

Surface Number 19

κ = 4.7133
C4 = 2.18905E−05
C6 = 2.96174E−08
C8 = −2.48536E−11
C10 = 4.13856E−14
C12 = −0.14040E−16
C14 = −0.31882E−18

(Variable Distances upon Focusing)

| | 1-POS | 2-POS | 3-POS | 4-POS | 5-POS |
|---|---|---|---|---|---|
| F0 &β | 20.60000 ∞ | −0.02500 818.5417 | −0.02500 813.6059 | −0.02500 812.2084 | −0.10897 179.3059 |
| D0 | | | | | |
| D1 | 4.09958 | 2.94075 | 3.36377 | 3.48406 | 0.80558 |
| D2 | 0.80877 | 1.42295 | 0.99272 | 0.87032 | 1.63227 |
| BF | 38.33575 | 38.88040 | 38.88761 | 38.88972 | 40.80625 |

(Values for Conditional Expressions)

(1) XR/XF = 0.47–0.9 (best value = 0.75)
(2) |FR/FF| = 0.746
(3) −FN/FP = 2.43
(4) κ = 0.448
(5) |C3| = 0.24258E−04
(6) (dmax−d0)/F0 = 0.0474

The moving ratio upon focusing defined by conditional expression (1) is not limited to one design solution and has an appropriate range that provides good optical performance. This example shows the appropriate range of the moving ratio.

Figure 7:
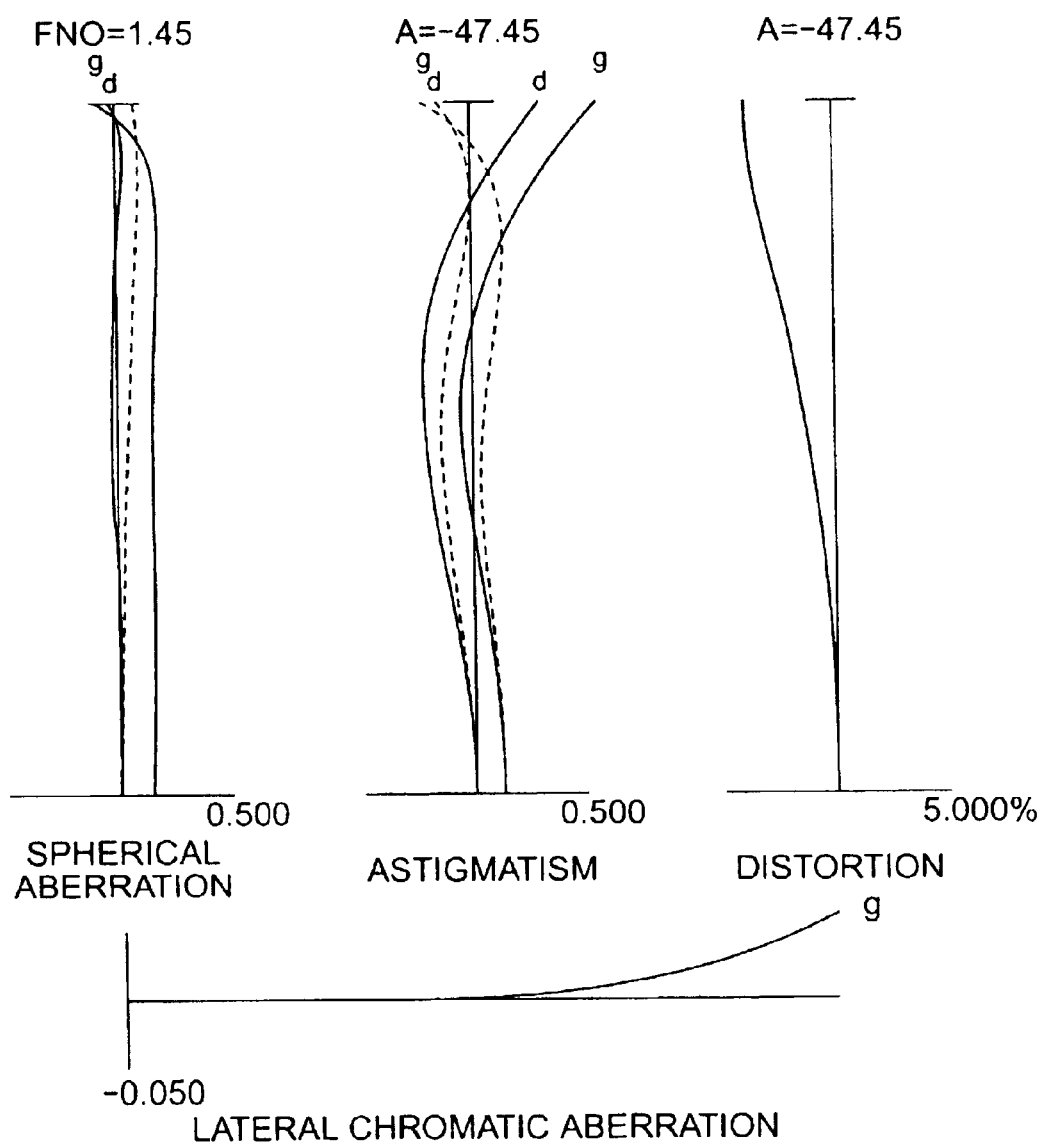
FIG. 7 graphically shows various aberrations of the lens system according to Example 2 when the system is focused at infinity.

FIG. 7 graphically shows various aberrations of the lens system according to Example 2 when the system is focused at infinity (1-POS).

Figure 8:
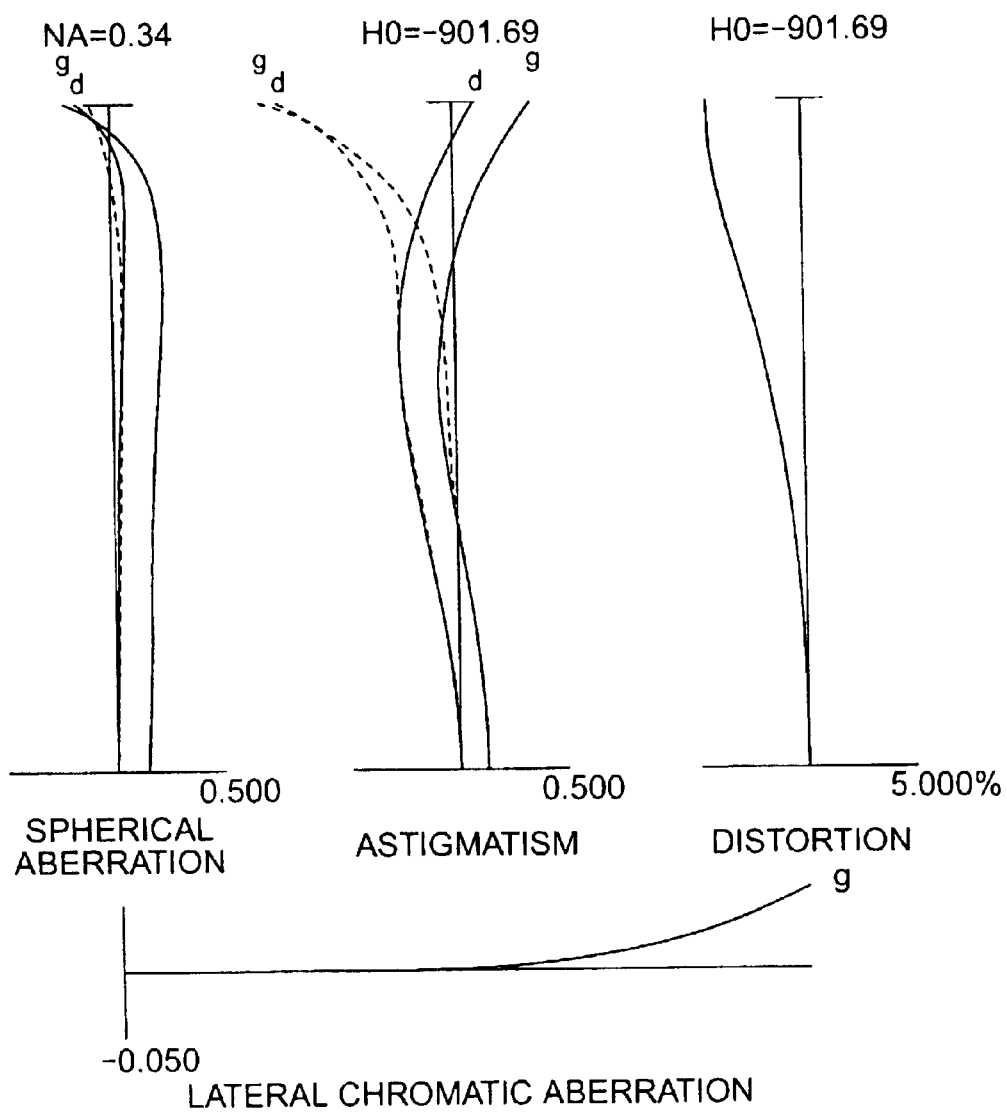
FIG. 8 graphically shows various aberrations of the lens system according to Example 2 when the system is focused at an object point with magnification $\beta = -1/40$ by using the lower limit value of the moving ratio of conditional expression (1).

FIG. 8 graphically shows various aberrations of the lens system according to Example 2 when the system is focused at an object point with magnification β=−1/40 by using the lower limit value (0.47) of the moving ratio of conditional expression (1) (2-POS).

Figure 9:
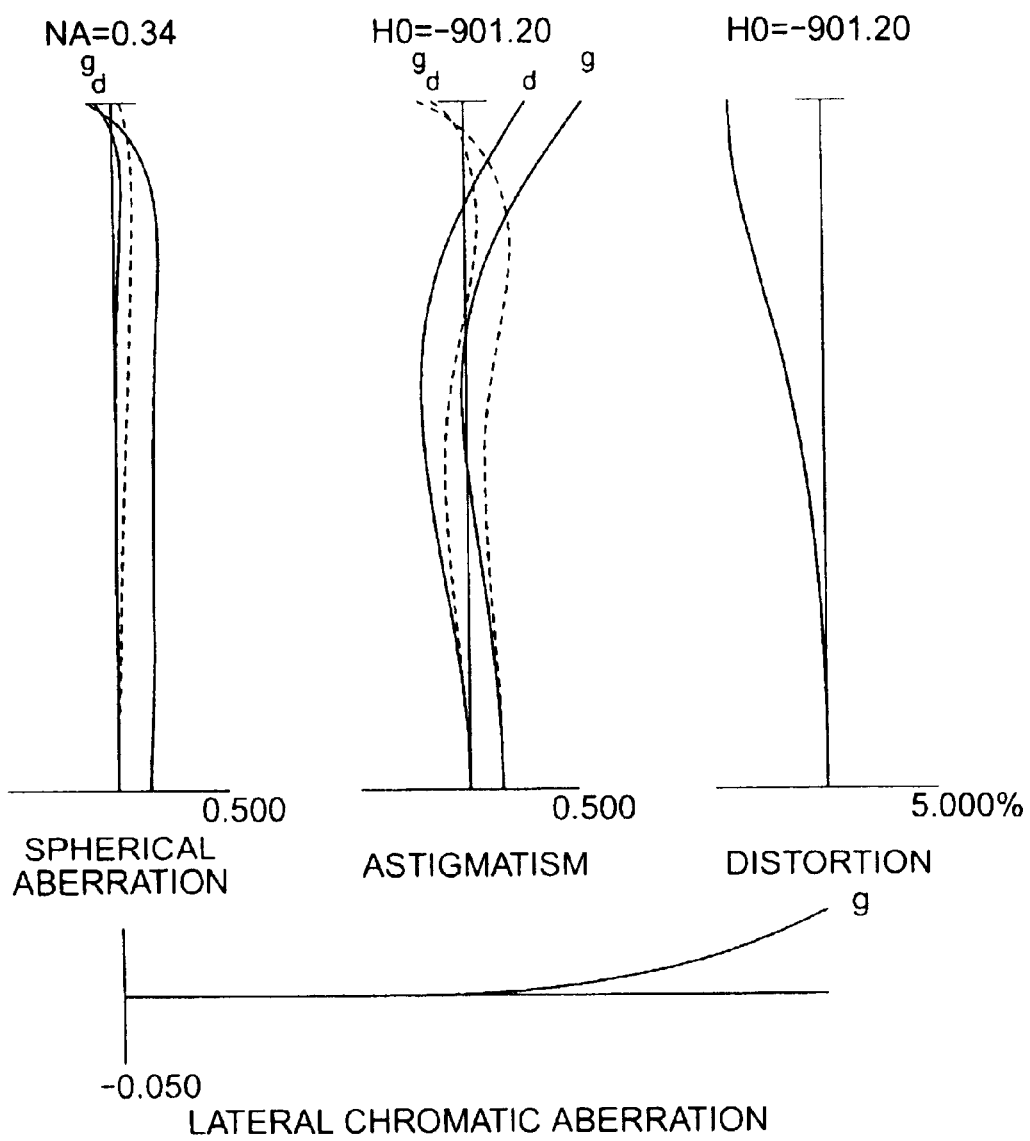
FIG. 9 graphically shows various aberrations of the lens system according to Example 2 when the system is focused at an object point with magnification $\beta = -1/40$ by using the most suitable moving ratio (best value) of conditional expression (1).

FIG. 9 graphically shows various aberrations of the lens system according to Example 2 when the system is focused at an object point with magnification β=−1/40 by using the most suitable moving ratio (0.75: best value) of conditional expression (1) (3-POS).

Figure 10:
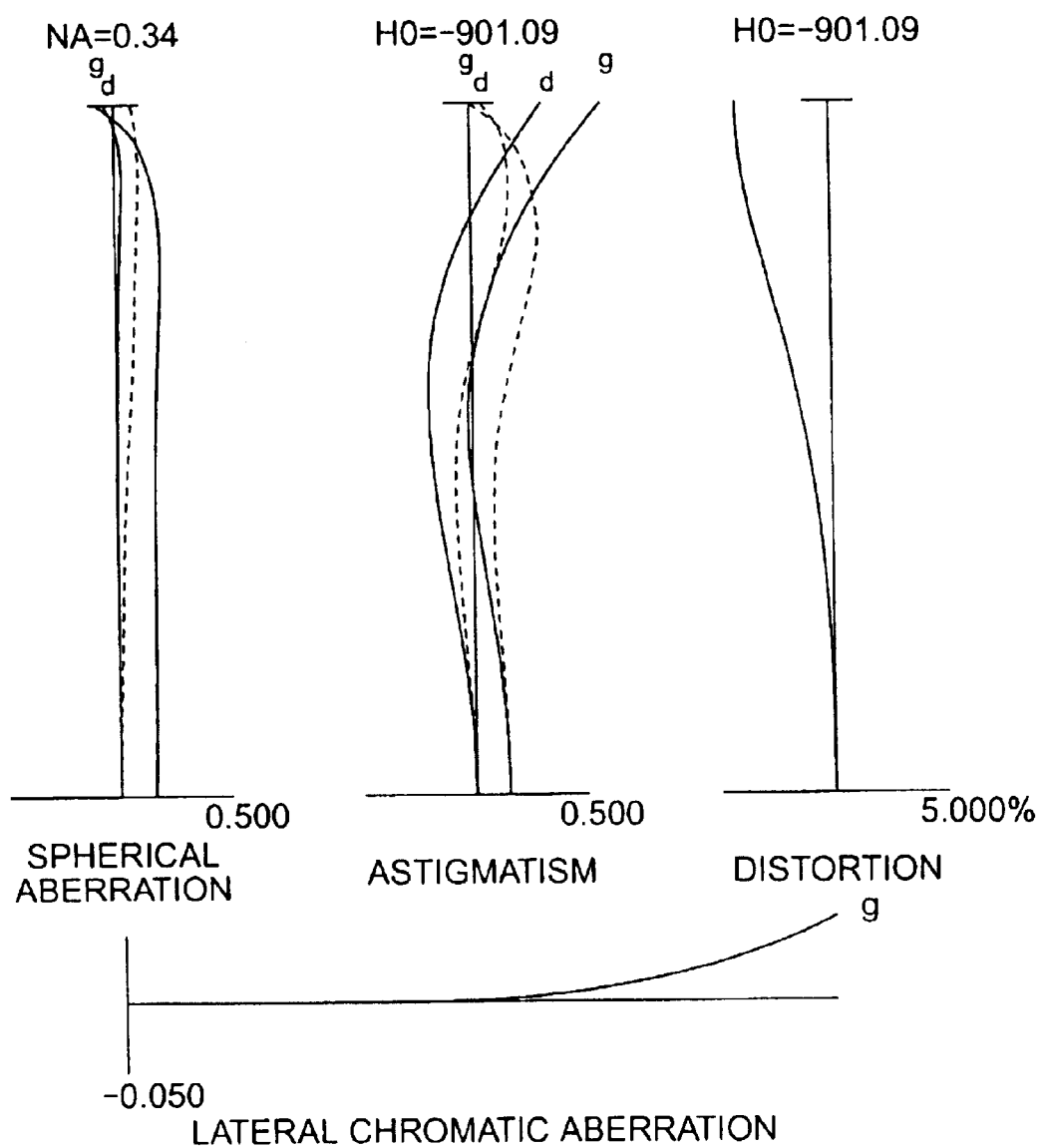
FIG. 10 graphically shows various aberrations of the lens system according to Example 2 when the system is focused at an object point with magnification $\beta = -1/40$ by using the upper limit value of the moving ratio of conditional expression (1).

FIG. 10 graphically shows various aberrations of the lens system according to Example 2 when the system is focused at an object point with magnification β=−1/40 by using the upper limit value (0.9) of the moving ratio of conditional expression (1) (4-POS).

FIG. 7 shows that off-axis aberrations such as spherical aberration, curvature of field, and astigmatism are corrected satisfactorily.

Result of best design solution is shown in FIG. 9. However, various aberrations shown in FIGS. 8 and 10 show that close-range aberration variations of spherical aberration, curvature of field, and astigmatism are corrected well.

In addition, since the above described focusing lens group works as a single optical system, the lens group can be used as a so-called vibration reduction lens group. Moreover, the focusing lens group can be used as a shift lens system by shifting from the optical axis.

EXAMPLE 3

Figure 11:
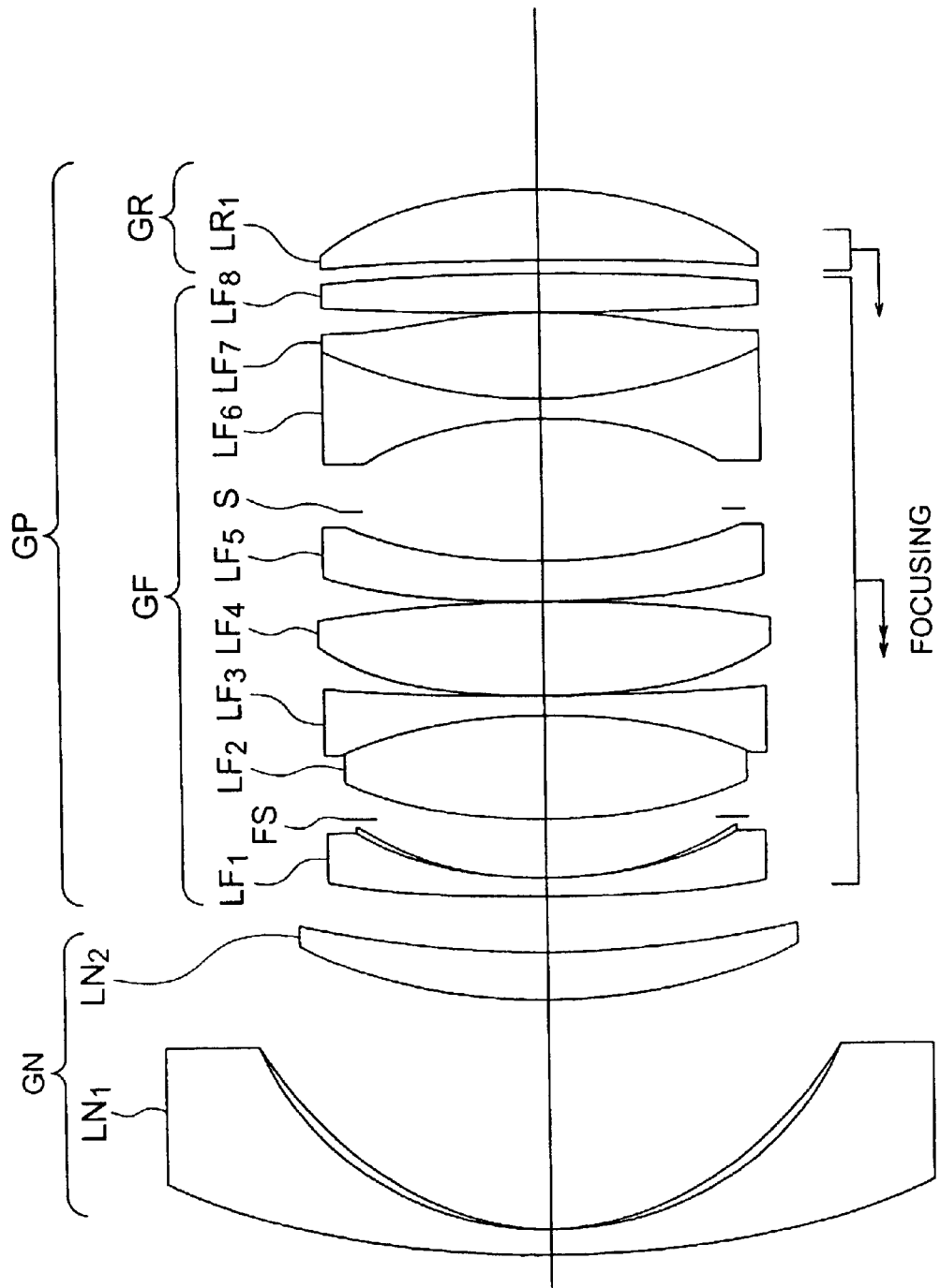
FIG. 11 is a diagram showing the lens arrangement of a large aperture super wide-angle lens system according to Example 3 of the present invention together with movement of lens groups upon focusing.

FIG. 11 is a diagram showing the lens arrangement of a large aperture super wide-angle lens system according to Example 3 of the present invention together with movement of lens groups upon focusing.

A large aperture super wide-angle lens system according to Example 3 is composed of, in order from an object, a negative lens group GN having negative refractive power which is fixed upon focusing, and a positive lens group GP having positive refractive power as a whole which is moved upon focusing.

The positive lens group GP has a front lens group GF having an aperture stop S and a rear lens group GR having positive refractive power.

The negative lens group GN is composed of, in order from the object, a composite negative meniscus aspherical lens LN1 having a convex surface facing to the object and an aspherical surface facing to an image constructed by resin and glass materials, and a positive meniscus lens LN2.

The front lens group GF is composed of, in order from the object, a composite negative meniscus aspherical lens LF1 having a convex surface facing to the object and an aspherical surface facing to an image constructed by resin and glass materials, a fixed stop FS, a positive cemented lens constructed by a double convex positive lens LF2 cemented with a double concave negative lens LF3, a double convex positive lens LF4, a negative meniscus lens LF5, an aperture stop S defining an f-number, a cemented negative lens constructed by a double concave negative lens LF6 cemented with a double convex positive lens LF7 having an aspherical surface facing to the image, and a double convex positive lens LF8.

The rear lens group GR is composed of a positive meniscus lens LR1 having a convex surface facing to the image.

Focusing at a close object is carried out by moving the front lens group GF and the rear lens group GR in the positive lens group GP toward the object with an appropriate moving ratio described later. In this case, the closest shooting distance is 0.47 m (magnification is about −0.058).

In Variable Distances upon Focusing shown in tables below, each distance at respective 5 positions (1-POS through 5-POS) shows the value at the best moving ratio.

Various values associated with Example 3 are listed in Table 3.

TABLE 3

(Specifications)

F0 = 20.62 mm
2ω = 94.45°
FNO = 1.437

(Lens Data)

| surface number | r | d | ν | n |
|---|---|---|---|---|
| 1) | 74.8370 | 2.0000 | 46.58 | 1.804000 |
| 2) | 24.7000 | 0.2000 | 38.73 | 1.553070 |
| 3) ◆ | 18.6516 | 17.3000 | | 1.000000 |
| 4) | 38.6123 | 4.0000 | 23.78 | 1.846660 |
| 5) | 80.5429 | D1 | | 1.000000 |
| 6) | 123.5009 | 1.7000 | 49.61 | 1.772500 |
| 7) | 29.0000 | 0.1000 | 38.73 | 1.553070 |
| 8) ◆ | 28.7241 | 4.6500 | | 1.000000 |
| 9) | | 2.0000 | | 1.000000 Fixed Stop FS |
| 10) | 52.7728 | 6.0000 | 65.42 | 1.603001 |
| 11) | −35.9197 | 1.0000 | 58.50 | 1.651599 |
| 12) | 278.4907 | 0.1000 | | 1.000000 |
| 13) | 38.5522 | 7.4500 | 37.35 | 1.834000 |
| 14) | −163.8707 | 0.1000 | | 1.000000 |
| 15) | 81.9485 | 3.0000 | 70.24 | 1.487490 |
| 16) | 42.7705 | 3.8500 | | 1.000000 |
| 17> | | 7.0000 | | 1.000000 Aperture Stop S |
| 18) | −34.7197 | 1.5000 | 23.78 | 1.846660 |
| 19) | 33.2411 | 7.0000 | 52.30 | 1.748099 |
| 20) ◆ | −45.7479 | 0.1000 | | 1.000000 |
| 21) | 263.2851 | 3.0000 | 52.30 | 1.748099 |
| 22) | −180.0589 | D2 | | 1.000000 |
| 23) | −160.9083 | 5.7000 | 52.30 | 1.748099 |
| 24) | −28.2620 | BF | | 1.000000 |

(Aspherical Surface Data)

Surface Number 3

κ = 0.4315
C3 = −0.30106E−04
C4 = −4.64790E−06
C6 = 6.80340E−09
C8 = −5.57510E−11
C10 = 7.78180E−14
C12 = −0.25455E−16
C14 = −0.58611E−19

Surface Number 8

κ = 1.0819
C3 = 0.50177E−04
C4 = −5.31810E−08
C5 = 0.21734E−06
C6 = 5.90360E−09
C7 = 0.46950E−09
C8 = −5.22060E−11
C10 = 9.13620E−14
C12 = −0.21538E−16

Surface Number 20

κ = 5.9407
C4 = 1.93290E−05
C6 = 4.23570E−08
C8 = −1.25010E−11
C10 = −3.09920E−14
C12 = 0.96159E−16
C14 = 0.12212E−17

(Variable Distances upon Focusing)

| | 1-POS | 2-POS | 3-POS | 4-POS | 5-POS |
|---|---|---|---|---|---|
| F0 &β | 20.60000 | −0.02500 | −0.02500 | −0.02500 | −0.05790 |

TABLE 3-continued

| D0 | ∞ | 824.8475 | 817.8938 | 816.5739 | 350.1085 |
|---|---|---|---|---|---|
| D1 | 4.06995 | 2.09350 | 2.80176 | 2.93687 | 1.07458 |
| D2 | 0.81269 | 2.19620 | 1.51020 | 1.37923 | 2.46014 |
| BF | 37.25891 | 37.85185 | 37.82960 | 37.82545 | 38.60683 |

(Values for Conditional Expressions)

(1) XR/XF = 0.3–0.5 (best value = 0.45)
(2) |FR/FF|= 0.5
(3) −FN/FP = 2.68
(4) κ = 0.4315
(5) |C3| = 0.50177E−04
(6) (dmax-d0)/F0 = 0.0581

The moving ratio upon focusing defined by conditional expression (1) is not limited to one design solution and has an appropriate range that provides good optical performance. This example shows the appropriate range of the moving ratio.

Figure 12:
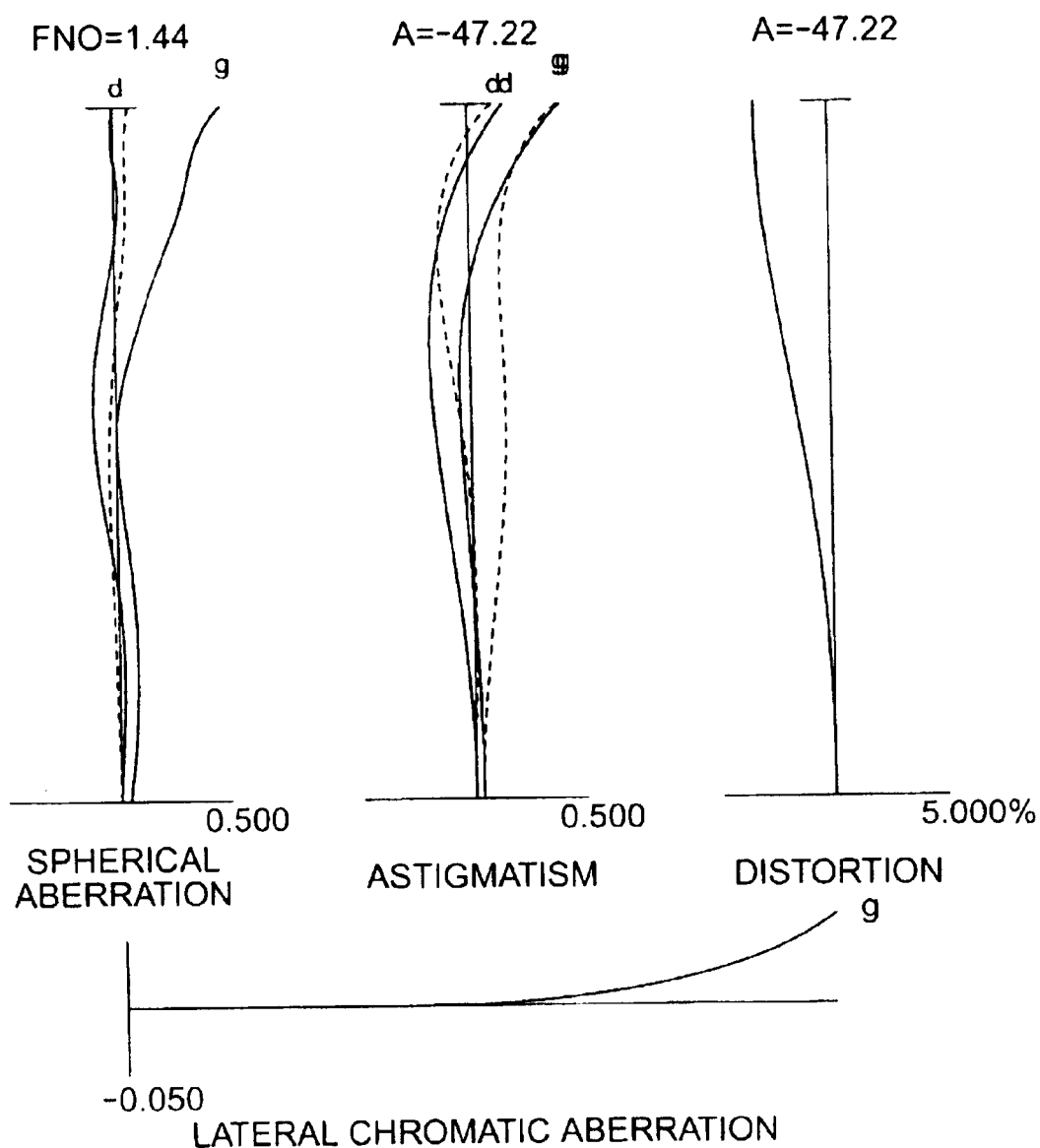
FIG. 12 graphically shows various aberrations of the lens system according to Example 3 when the system is focused at infinity.

FIG. 12 graphically shows various aberrations of the lens system according to Example 3 when the system is focused at infinity (1-POS).

Figure 13:
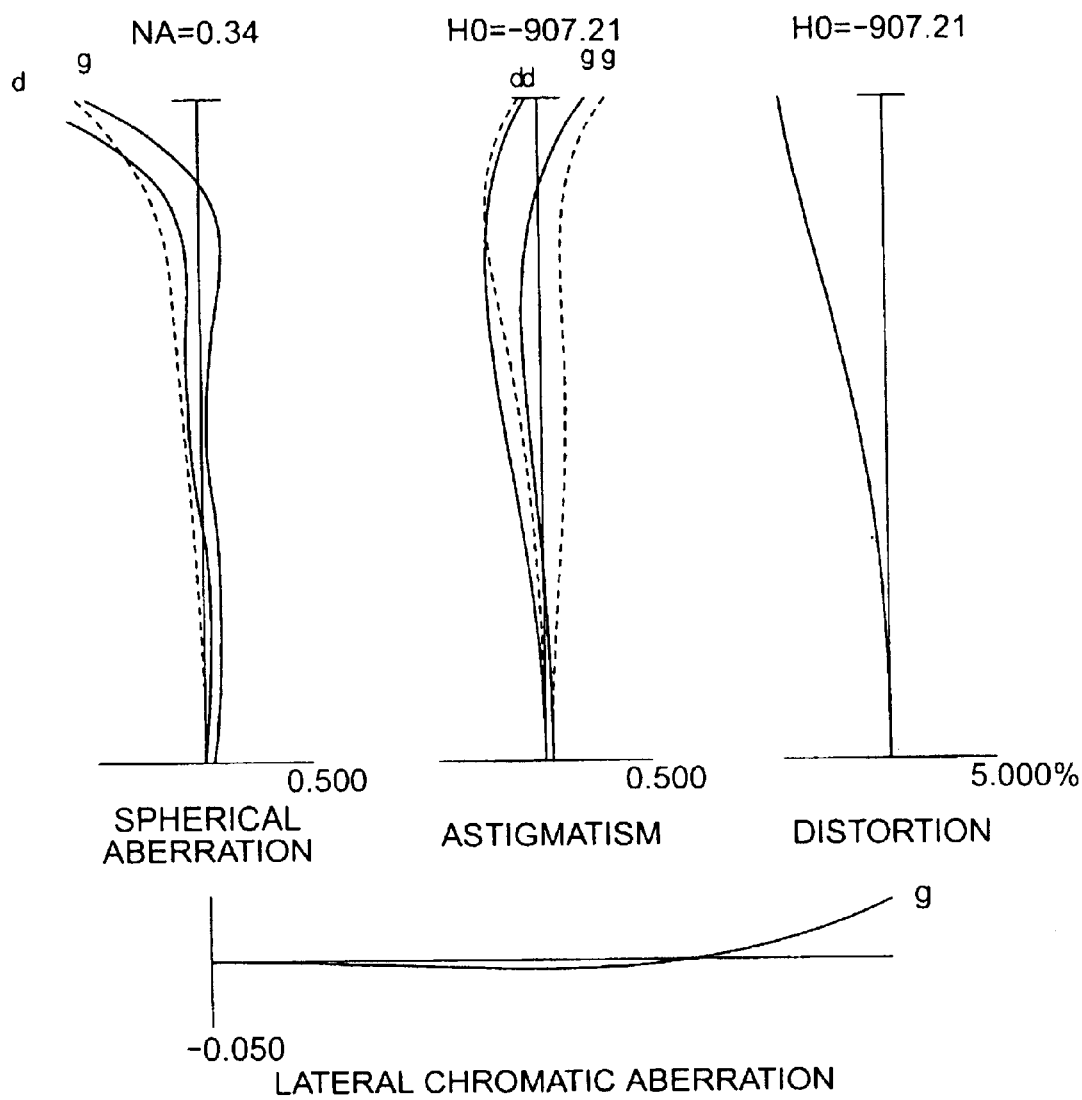
FIG. 13 graphically shows various aberrations of the lens system according to Example 3 when the system is focused at an object point with magnification $\beta = -1/40$ by using the lower limit value of the moving ratio of conditional expression (1).

FIG. 13 graphically shows various aberrations of the lens system according to Example 3 when the system is focused at an object point with magnification β=−1/40 by using the lower limit value (0.3) of the moving ratio of conditional expression (1) (2-POS).

Figure 14:
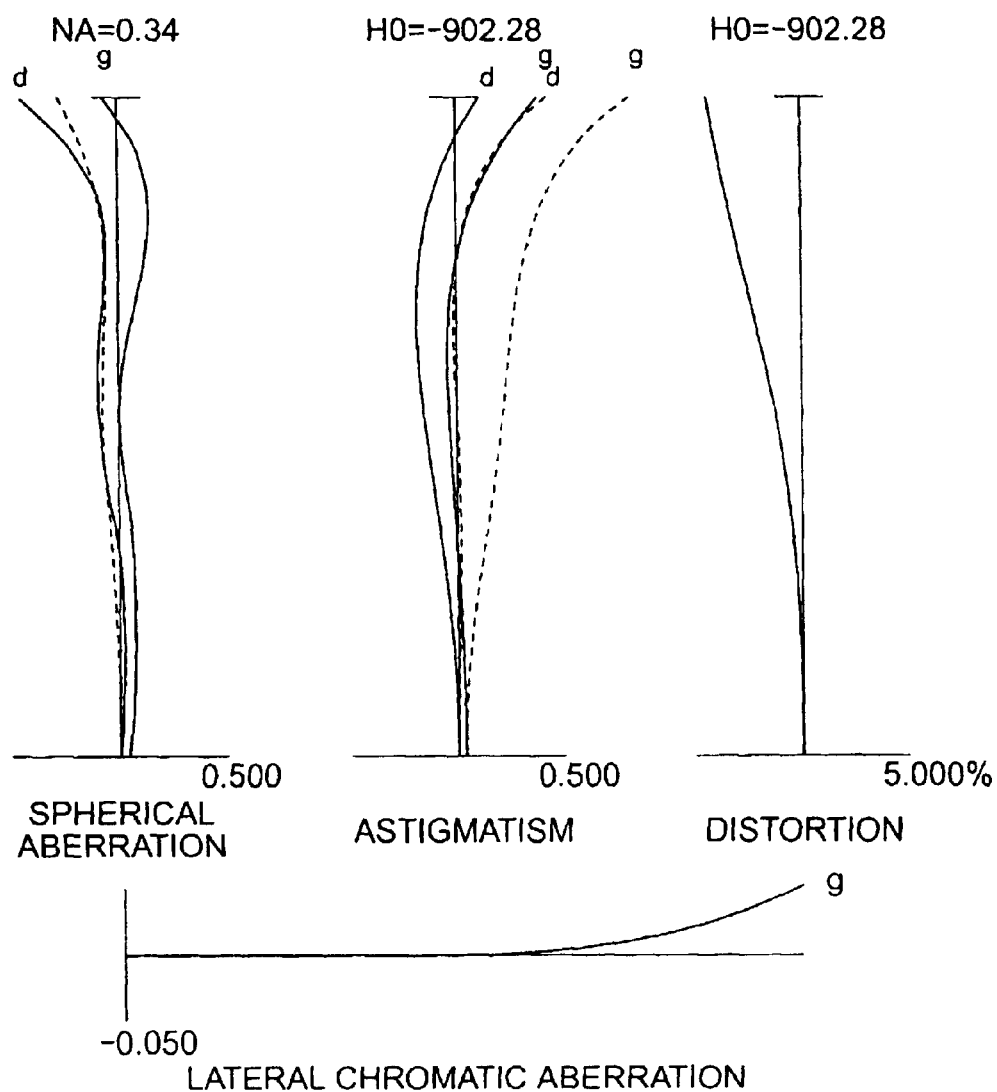
FIG. 14 graphically shows various aberrations of the lens system according to Example 3 when the system is focused at an object point with magnification $\beta = -1/40$ by using the most suitable moving ratio (best value) of conditional expression (1).

FIG. 14 graphically shows various aberrations of the lens system according to Example 3 when the system is focused at an object point with magnification β=−1/40 by using the most suitable moving ratio (0.45: best value) of conditional expression (1) (3-POS).

Figure 15:
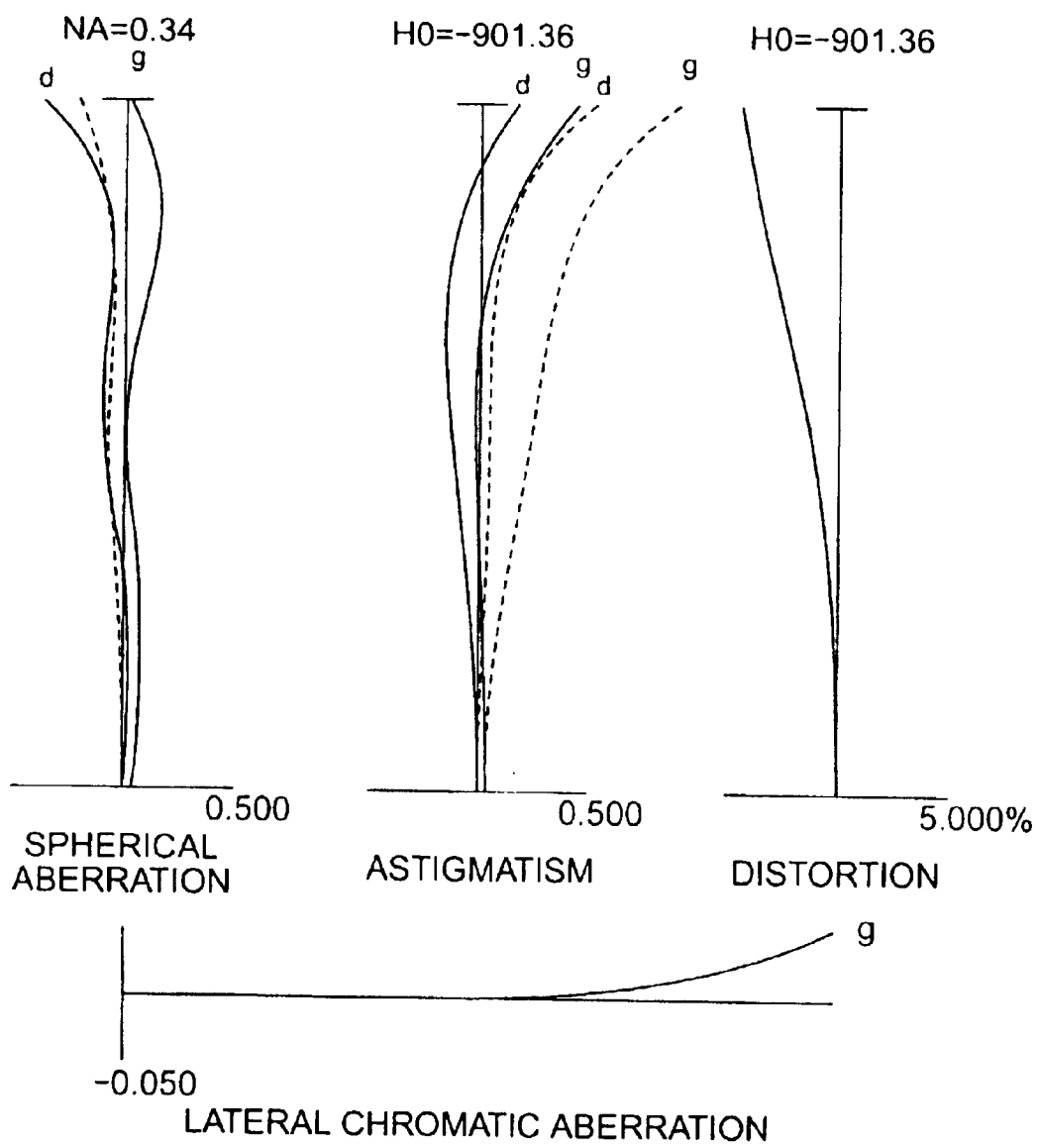
FIG. 15 graphically shows various aberrations of the lens system according to Example 3 when the system is focused at an object point with magnification $\beta = -1/40$ by using the upper limit value of the moving ratio of conditional expression (1).

FIG. 15 graphically shows various aberrations of the lens system according to Example 3 when the system is focused at an object point with magnification β=−1/40 by using the upper limit value (0.5) of the moving ratio of conditional expression (1) (4-POS).

FIG. 12 shows that off-axis aberrations such as spherical aberration, curvature of field, and astigmatism are corrected satisfactorily.

Result of best design solution is shown in FIG. 14. However, various aberrations shown in FIGS. 13 and 15 show that close-range aberration variations of spherical aberration, curvature of field, and astigmatism are corrected well.

In addition, since the above described focusing lens group works as a single optical system, the lens group can be used as a so-called vibration reduction lens group. Moreover, the focusing lens group can be used as a shift lens system by shifting from the optical axis.

According to the present invention, a large aperture super wide-angle lens system having an angle of view of 2ω=94° or more, an f-number of about 1.4, small variation in close-range aberrations, compactness, and high optical performance can be provided.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A super wide-angle lens system comprising, in order from an object;
    a negative lens group having negative refractive power which is fixed upon focusing; and
    a positive lens group having positive refractive power as a whole which is moved upon focusing;
    the positive lens group including;
        a front lens group having an aperture stop; and
        a rear lens group having positive refractive power;
        focusing at a close object being carried out by moving the front lens group GF and the rear lens group GR to the object side with different moving amounts; and
        the following conditional expression being satisfied:

$$0.1 < XR/XF < 1.0$$

where XF and XR denote the moving amounts of the front lens group GF and the rear lens group GR, respectively, when focusing at an any close object.

2. The super wide-angle lens system according to claim 1, wherein
    the following conditional expression is satisfied:

$$0.1 < |FR/FF| < 5.2$$

where FF denotes the focal length of the front lens group, and FR denotes the focal length of the rear lens group.

3. The super wide-angle lens system according to claim 2, wherein the following conditional expression is satisfied:

$$1.0 < -FN/FP < 5.0$$

where FN denotes the focal length of the negative lens group, and FP denotes the focal length of the positive lens group.

4. The super wide-angle lens system according to claim 3, wherein;
    the negative lens group includes at least one negative lens element and at least one positive lens element locating to the image side of the negative lens element; and
    the negative lens element has an aspherical surface facing to a concave surface side; and
    wherein when the aspherical surface is expressed by the following expression:

$$X(y) = (y^2/r0)/\left[1 + (1 - \kappa \cdot y^2/r0^2)^{1/2}\right] + C3 \cdot |y^3| + C4 \cdot y^4 + C6 \cdot y^6 + C8 \cdot y^8 + C10 \cdot y^{10} + C12 \cdot y^{12} + C14 \cdot y^{14},$$

the following conditional expression is satisfied:

$$-1.0 < \kappa < 1.0$$

where X(y) denotes the displacement (sag amount) in the optical axis direction from the tangent plane of the vertex of the aspherical surface at the height y from the optical axis in a vertical direction relative to the optical axis to the aspherical surface, r0 denotes the reference radius of curvature, κ denotes the conical coefficient, Cn denotes an n-th order aspherical coefficient.

5. The super wide-angle lens system according to claim 4, wherein;
    the front lens group GF includes a negative lens element located to the object side of the aperture stop, and the negative lens element has an aspherical surface including a $3^{rd}$ order aspherical coefficient C3, and wherein when the aspherical surface is expressed by the following expression:

$$X(y) = (y^2/r0)/\left[1 + (1 - \kappa \cdot y^2/r0^2)^{1/2}\right] +$$
$$C3 \cdot |y^3| + C4 \cdot y^4 + C5 \cdot |y^5| +$$
$$C6 \cdot y^6 + C7 \cdot |y^7| + C8 \cdot y^8 +$$
$$C10 \cdot y^{10} + C12 \cdot y^{12},$$

the following conditional expression (5) is satisfied:

$$1.0 \times 10^{-6} < |C3| < 1.0 \times 10^{-2}$$

where X(y) denotes the displacement (sag amount) in the optical axis direction from the tangent plane of the vertex of the aspherical surface at the height y from the optical axis in a vertical direction relative to the optical axis to the aspherical surface, r0 denotes the reference radius of curvature, κ denotes the conical coefficient, Cn denotes an n-th order aspherical coefficient.

6. The super wide-angle lens system according to claim 5, wherein;

the negative lens element having an aspherical surface locating the most object side of the negative lens group is a composite aspherical lens constructed by a glass material and a resin material, and wherein the following conditional expression is satisfied:

$$0.0015 < (dmax - d0)/F0 < 0.5$$

where d0 denotes the thickness along the optical axis of the resin material forming the aspherical surface, dmax denotes the thickness of the resin material in the direction of the optical axis where the thickness becomes maximum within the effective aperture, and F0 denotes the focal length of the super wide-angle lens system.

7. The super wide-angle lens system according to claim 3, wherein;

the front lens group GF includes a negative lens element located to the object side of the aperture stop, and the negative lens element has an aspherical surface including a $3^{rd}$ order aspherical coefficient C3, and wherein when the aspherical surface is expressed by the following expression:

$$X(y) = (y^2/r0)/\left[1 + (1 - \kappa \cdot y^2/r0^2)^{1/2}\right] +$$
$$C3 \cdot |y^3| + C4 \cdot y^4 + C5 \cdot |y^5| +$$
$$C6 \cdot y^6 + C7 \cdot |y^7| + C8 \cdot y^8 +$$
$$C10 \cdot y^{10} + C12 \cdot y^{12},$$

the following conditional expression (5) is satisfied:

$$1.0 \times 10^{-6} < |C3| < 1.0 \times 10^{-2}$$

where X(y) denotes the displacement (sag amount) in the optical axis direction from the tangent plane of the vertex of the aspherical surface at the height y from the optical axis in a vertical direction relative to the optical axis to the aspherical surface, r0 denotes the reference radius of curvature, K denotes the conical coefficient, Cn denotes an n-th order aspherical coefficient.

8. The super wide-angle lens system according to claim 7, wherein;

the negative lens element having an aspherical surface locating the most object side of the negative lens group is a composite aspherical lens constructed by a glass material and a resin material, and wherein the following conditional expression is satisfied:

$$0.0015 < (dmax - d0)/F0 < 0.5$$

where d0 denotes the thickness along the optical axis of the resin material forming the aspherical surface, dmax denotes the thickness of the resin material in the direction of the optical axis where the thickness becomes maximum within the effective aperture, and F0 denotes the focal length of the super wide-angle lens system.

9. The super wide-angle lens system according to claim 3, wherein;

the negative lens element having an aspherical surface locating the most object side of the negative lens group is a composite aspherical lens constructed by a glass material and a resin material, and wherein the following conditional expression is satisfied:

$$0.0015 < (dmax - d0)/F0 < 0.5$$

where d0 denotes the thickness along the optical axis of the resin material forming the aspherical surface, dmax denotes the thickness of the resin material in the direction of the optical axis where the thickness becomes maximum within the effective aperture, and F0 denotes the focal length of the super wide-angle lens system.

10. The super wide-angle lens system according to claim 2, wherein;

the negative lens group includes at least one negative lens element and at least one positive lens element locating to the image side of the negative lens element; and the negative lens element has an aspherical surface facing to a concave surface side; and wherein when the aspherical surface is expressed by the following expression:

$$X(y) = (y^2/r0)/\left[1 + (1 - \kappa \cdot y^2/r0^2)^{1/2}\right] +$$
$$C3 \cdot |y^3| + C4 \cdot y^4 + C6 \cdot y^6 + C8 \cdot y^8 +$$
$$C10 \cdot y^{10} + C12 \cdot y^{12} + C14 \cdot y^{14},$$

the following conditional expression is satisfied:

$$-1.0 < \kappa < 1.0$$

where X(y) denotes the displacement (sag amount) in the optical axis direction from the tangent plane of the vertex of the aspherical surface at the height y from the optical axis in a vertical direction relative to the optical axis to the aspherical surface, r0 denotes the reference radius of curvature, κ denotes the conical coefficient, Cn denotes an n-th order aspherical coefficient.

11. The super wide-angle lens system according to claim 10, wherein;

the negative lens element having an aspherical surface locating the most object side of the negative lens group is a composite aspherical lens constructed by a glass material and a resin material, and wherein the following conditional expression is satisfied:

$$0.0015 < (dmax - d0)/F0 < 0.5$$

where d0 denotes the thickness along the optical axis of the resin material forming the aspherical surface, dmax denotes the thickness of the resin material in the direction of the optical axis where the thickness becomes maximum within the effective aperture, and F0 denotes the focal length of the super wide-angle lens system.

12. The super wide-angle lens system according to claim 2, wherein;

the front lens group GF includes a negative lens element located to the object side of the aperture stop, and the negative lens element has an aspherical surface including a $3^{rd}$ order aspherical coefficient C3, and wherein when the aspherical surface is expressed by the following expression:

$$X(y) = (y^2/r0) / \left[ 1 + (1 - \kappa \cdot y^2 / r0^2)^{1/2} \right] +$$
$$C3 \cdot |y^3| + C4 \cdot y^4 + C5 \cdot |y^5| +$$
$$C6 \cdot y^6 + C7 \cdot |y^7| + C8 \cdot y^8 +$$
$$C10 \cdot y^{10} + C12 \cdot y^{12},$$

the following conditional expression (5) is satisfied:

$$1.0 \times 10^{-6} < |C3| < 1.0 \times 10^{-2}$$

where X(y) denotes the displacement (sag amount) in the optical axis direction from the tangent plane of the vertex of the aspherical surface at the height y from the optical axis in a vertical direction relative to the optical axis to the aspherical surface, r0 denotes the reference radius of curvature, κ denotes the conical coefficient, Cn denotes an n-th order aspherical coefficient.

13. The super wide-angle lens system according to claim 12, wherein;

the negative lens element having an aspherical surface locating the most object side of the negative lens group is a composite aspherical lens constructed by a glass material and a resin material, and wherein the following conditional expression is satisfied:

$$0.0015 < (dmax - d0)/F0 < 0.5$$

where d0 denotes the thickness along the optical axis of the resin material forming the aspherical surface, dmax denotes the thickness of the resin material in the direction of the optical axis where the thickness becomes maximum within the effective aperture, and F0 denotes the focal length of the super wide-angle lens system.

14. The super wide-angle lens system according to claim 2, wherein;

the negative lens element having an aspherical surface locating the most object side of the negative lens group is a composite aspherical lens constructed by a glass material and a resin material, and wherein the following conditional expression is satisfied:

$$0.0015 < (dmax - d0)/F0 < 0.5$$

where d0 denotes the thickness along the optical axis of the resin material forming the aspherical surface, dmax denotes the thickness of the resin material in the direction of the optical axis where the thickness becomes maximum within the effective aperture, and F0 denotes the focal length of the super wide-angle lens system.

15. The super wide-angle lens system according to claim 1, wherein the following conditional expression is satisfied:

$$1.0 < -FN/FP < 5.0$$

where FN denotes the focal length of the negative lens group, and FP denotes the focal length of the positive lens group.

16. The super wide-angle lens system according to claim 15, wherein;

the negative lens group includes at least one negative lens element and at least one positive lens element locating to the image side of the negative lens element; and the negative lens element has an aspherical surface facing to a concave surface side; and wherein when the aspherical surface is expressed by the following expression:

$$X(y) = (y^2/r0) / \left[ 1 + (1 - \kappa \cdot y^2 / r0^2)^{1/2} \right] +$$
$$C3 \cdot |y^3| + C4 \cdot y^4 + C6 \cdot y^6 + C8 \cdot y^8 +$$
$$C10 \cdot y^{10} + C12 \cdot y^{12} + C14 \cdot y^{14},$$

the following conditional expression is satisfied:

$$-1.0 < \kappa < 1.0$$

where X(y) denotes the displacement (sag amount) in the optical axis direction from the tangent plane of the vertex of the aspherical surface at the height y from the optical axis in a vertical direction relative to the optical axis to the aspherical surface, r0 denotes the reference radius of curvature, κ denotes the conical coefficient, Cn denotes an n-th order aspherical coefficient.

17. The super wide-angle lens system according to claim 16, wherein;

the negative lens element having an aspherical surface locating the most object side of the negative lens group is a composite aspherical lens constructed by a glass material and a resin material, and wherein the following conditional expression is satisfied:

$$0.0015 < (dmax - d0)/F0 < 0.5$$

where d0 denotes the thickness along the optical axis of the resin material forming the aspherical surface, dmax denotes the thickness of the resin material in the direction of the optical axis where the thickness becomes maximum within the effective aperture, and F0 denotes the focal length of the super wide-angle lens system.

18. The super wide-angle lens system according to claim 15, wherein;

the front lens group GF includes a negative lens element located to the object side of the aperture stop, and the negative lens element has an aspherical surface including a $3^{rd}$ order aspherical coefficient C3, and wherein when the aspherical surface is expressed by the following expression:

$$X(y) = (y^2/r0)/\left[1+(1-\kappa\cdot y^2/r0^2)^{1/2}\right] +$$
$$C3\cdot|y^3|+C4\cdot y^4+C5\cdot|y^5|+$$
$$C6\cdot y^6+C7\cdot|y^7|+C8\cdot y^8+$$
$$C10\cdot y^{10}+C12\cdot y^{12},$$

the following conditional expression (5) is satisfied:

$$1.0\times10^{-6}<|C3|<1.0\times10^{-2}$$

where X(y) denotes the displacement (sag amount) in the optical axis direction from the tangent plane of the vertex of the aspherical surface at the height y from the optical axis in a vertical direction relative to the optical axis to the aspherical surface, r0 denotes the reference radius of curvature, κ denotes the conical coefficient, Cn denotes an n-th order aspherical coefficient.

19. The super wide-angle lens system according to claim 18, wherein;
the negative lens element having an aspherical surface locating the most object side of the negative lens group is a composite aspherical lens constructed by a glass material and a resin material, and
wherein the following conditional expression is satisfied:

$$0.0015<(dmax-d0)/F0<0.5$$

where d0 denotes the thickness along the optical axis of the resin material forming the aspherical surface, dmax denotes the thickness of the resin material in the direction of the optical axis where the thickness becomes maximum within the effective aperture, and F0 denotes the focal length of the super wide-angle lens system.

20. The super wide-angle lens system according to claim 15, wherein;
the negative lens element having an aspherical surface locating the most object side of the negative lens group is a composite aspherical lens constructed by a glass material and a resin material, and
wherein the following conditional expression is satisfied:

$$0.0015<(dmax-d0)/F0<0.5$$

where d0 denotes the thickness along the optical axis of the resin material forming the aspherical surface, dmax denotes the thickness of the resin material in the direction of the optical axis where the thickness becomes maximum within the effective aperture, and F0 denotes the focal length of the super wide-angle lens system.

21. The super wide-angle lens system according to claim 1, wherein;
the negative lens group includes at least one negative lens element and at least one positive lens element locating to the image side of the negative lens element; and
the negative lens element has an aspherical surface facing to a concave surface side; and
wherein when the aspherical surface is expressed by the following expression:

$$X(y) = (y^2/r0)/\left[1+(1-\kappa\cdot y^2/r0^2)^{1/2}\right] +$$
$$C3\cdot|y^3|+C4\cdot y^4+C6\cdot y^6+C8\cdot y^8+$$
$$C10\cdot y^{10}+C12\cdot y^{12}+C14\cdot y^{14},$$

the following conditional expression is satisfied:

$$-1.0<\kappa<1.0$$

where X(y) denotes the displacement (sag amount) in the optical axis direction from the tangent plane of the vertex of the aspherical surface at the height y from the optical axis in a vertical direction relative to the optical axis to the aspherical surface, r0 denotes the reference radius of curvature, κ denotes the conical coefficient, Cn denotes an n-th order aspherical coefficient.

22. The super wide-angle lens system according to claim 21, wherein;
the negative lens element having an aspherical surface locating the most object side of the negative lens group is a composite aspherical lens constructed by a glass material and a resin material, and
wherein the following conditional expression is satisfied:

$$0.0015<(dmax-d0)/F0<0.5$$

where d0 denotes the thickness along the optical axis of the resin material forming the aspherical surface, dmax denotes the thickness of the resin material in the direction of the optical axis where the thickness becomes maximum within the effective aperture, and F0 denotes the focal length of the super wide-angle lens system.

23. The super wide-angle lens system according to claim 1, wherein;
the front lens group GF includes a negative lens element located to the object side of the aperture stop, and the negative lens element has an aspherical surface including a $3^{rd}$ order aspherical coefficient C3, and
wherein when the aspherical surface is expressed by the following expression:

$$X(y) = (y^2/r0)/\left[1+(1-\kappa\cdot y^2/r0^2)^{1/2}\right] +$$
$$C3\cdot|y^3|+C4\cdot y^4+C5\cdot|y^5|+$$
$$C6\cdot y^6+C7\cdot|y^7|+C8\cdot y^8+$$
$$C10\cdot y^{10}+C12\cdot y^{12},$$

the following conditional expression (5) is satisfied:

$$1.0\times10^{-6}<|C3|<1.0\times10^{-2}$$

where X(y) denotes the displacement (sag amount) in the optical axis direction from the tangent plane of the vertex of the aspherical surface at the height y from the optical axis in a vertical direction relative to the optical axis to the aspherical surface, r0 denotes the reference radius of curvature, κ denotes the conical coefficient, Cn denotes an n-th order aspherical coefficient.

24. The super wide-angle lens system according to claim 23, wherein;
the negative lens element having an aspherical surface locating the most object side of the negative lens group is a composite aspherical lens constructed by a glass material and a resin material, and wherein the following conditional expression is satisfied:

$$0.0015 < (dmax - d0)/F0 < 0.5$$

where d0 denotes the thickness along the optical axis of the resin material forming the aspherical surface, dmax denotes the thickness of the resin material in the direction of the optical axis where the thickness becomes maximum within the effective aperture, and F0 denotes the focal length of the super wide-angle lens system.

25. The super wide-angle lens system according to claim 1, wherein;

the negative lens element having an aspherical surface locating the most object side of the negative lens group is a composite aspherical lens constructed by a glass material and a resin material, and wherein the following conditional expression is satisfied:

$$0.0015 < (dmax - d0)/F0 < 0.5$$

where d0 denotes the thickness along the optical axis of the resin material forming the aspherical surface, dmax denotes the thickness of the resin material in the direction of the optical axis where the thickness becomes maximum within the effective aperture, and F0 denotes the focal length of the super wide-angle lens system.

26. A shooting device using the super wide-angle lens system according to claim 1.

* * * * *